(12) United States Patent
Ussery et al.

(10) Patent No.: US 7,296,150 B2
(45) Date of Patent: Nov. 13, 2007

(54) DATABASE MANAGEMENT SYSTEMS AND METHODS OF OPERATING THE SAME

(75) Inventors: Troy A. Ussery, Plano, TX (US); Dean Rucinski, Plano, TX (US); Jeffrey D. Balcombe, Plano, TX (US)

(73) Assignee: Business-To-Investor, Inc., Richardson, TX (US)

( * ) Notice: Subject to any disclaimer, the term of this patent is extended or adjusted under 35 U.S.C. 154(b) by 925 days.

(21) Appl. No.: 09/751,246

(22) Filed: Dec. 29, 2000

(65) Prior Publication Data
US 2002/0049903 A1    Apr. 25, 2002

Related U.S. Application Data

(63) Continuation-in-part of application No. 09/694,425, filed on Oct. 23, 2000.

(51) Int. Cl.
*H04L 9/00* (2006.01)
(52) U.S. Cl. .................................................. 713/164
(58) Field of Classification Search ............... 707/10, 707/104.1, 3, 103 X; 709/201, 202, 203; 705/51; 713/165
See application file for complete search history.

(56) References Cited

U.S. PATENT DOCUMENTS

| | | | | |
|---|---|---|---|---|
| 4,534,056 A | * | 8/1985 | Feilchenfeld et al. | ....... 704/272 |
| 4,769,772 A | * | 9/1988 | Dwyer | ............................ 707/2 |
| 5,689,648 A | * | 11/1997 | Diaz et al. | ...................... 705/26 |
| 5,764,949 A | * | 6/1998 | Huang et al. | ................. 707/102 |
| 5,884,299 A | * | 3/1999 | Ramesh et al. | ................. 707/2 |
| 6,130,759 A | * | 10/2000 | Blair | .......................... 358/1.17 |
| 6,173,042 B1 | * | 1/2001 | Wu | ........................... 379/88.04 |
| 6,363,481 B1 | * | 3/2002 | Hardjono | ..................... 713/165 |

OTHER PUBLICATIONS

Worker Exposure Surveillance System (WESS) Users Guide, 1997, Oak Ridge Associated Universities.*
Microsoft Computer Dictionary, 5th edition, 2002, Microsoft press.*

* cited by examiner

Primary Examiner—Kambiz Zand
Assistant Examiner—Thomas Ho

(57) ABSTRACT

Introduced are systems for managing a database of selectable records, and methods of operating the same. One advantageous embodiment provides a database administrator for association with a computer system having distributed memory units. The database administrator comprises a security controller and an access controller. The security controller operates repeatedly to (i) divide the database into portions and (ii) store ones of the portions to ones of the distributed memory units. The security controller thereby systematically redistributes the database over the distributed memory units. The access controller operates to repeatedly establish views of ones of the selectable records in response to the security controller redistributing the database over the distributed memory units.

32 Claims, 13 Drawing Sheets

DATABASE MANAGEMENT SYSTEMS AND METHODS OF OPERATING THE SAME

RELATIONSHIP TO OTHER APPLICATIONS

This application is a continuation-in-part of copending application Ser. No. 09/694,425 filed Oct. 23, 2000.

TECHNICAL FIELD OF THE INVENTION

The present invention is directed, in general, to database management systems and related methodologies and, more specifically, to systems for managing a database of selectable records wherein portions of the database are repeatedly redistributed over distributed memory units, and methods of operating the same.

BACKGROUND OF THE INVENTION

The commercial availability of more efficient, reliable and cost effective computers has enabled businesses and individuals to rely ever increasingly upon the same, as well as on related peripheral devices, to meet their information and processing needs. In recent years, the immeasurable gains in technology experienced by the computer and communications industries have enabled the growth of global communications networks (e.g., the Internet). The Internet is an ever extending communications network of interconnected computers throughout the world. Together, these interconnected computers form a vast repository of hyperlinked information effortlessly accessible by any of the connected computers from virtually anywhere and at anytime. As a direct result, there has been exponential growth in businesses that provide information and execute transactions via the Internet, these business are commonly said to be engaged in "electronic commerce."

In addition, wireless computing devices were introduced to provide mobile access to the Internet. These devices are capable of communicating, via wireless data networks, with the computers on the Internet. With the wireless data networks, people, as they move about, are able to perform, through the wireless computing devices, exactly the same tasks they could with computers wired directly to the Internet.

A common remote access standard today is the use of a laptop computer equipped with a wireless communication mechanism, for instance, a wireless modem. This standard is useful for many applications and users, but there has been a growing need for another mobile standard in which the Internet can be instantly accessed by mobile devices, such as cellular phones, personal digital assistants ("PDAs") and other two-way messaging devices. Such mobile devices are generally designed to be small in size and light in weight.

With increasing data processing capabilities in the mobile devices, increasing numbers of users are carrying devices around to materialize their unproductive time into productive time. As more commonly seen, regular mobile phones can return calls, check voice mail or make their users available for teleconferences anywhere and at anytime, but desired mobile phones, not just reactive to calls but also proactive, can meld voice, data, and personal information manager-like functionality into a single handset that can effectively, through a host computer, access a myriad of public and enterprise information services in the Internet.

The progress of mobile connectivity, coupled with the increased access to and ever increasing power of wired communication systems, has been fueled by the demand for immediate access to the information that users require. In conventional systems, a user logs on to a client machine, establishing a connection to a database located on a server machine across a communications network. In the typical scenario, to establish access, the user must pass security mechanisms provided by the server machine's operating system, database management system, or both.

For instance, a traveling businessman requests flight information on his way to airport, or a stock broker places an order for shares of stock at a certain price. Likely information garnered from these transactions may respectively include the airline and the flight number for the traveler and the number of shares and the price at which the broker purchased. To be timely informed, a preferable way is to communicate the information requests electronically into a communications network. The communications network, for example, connects to a flight information database server or stock quote database server so that the desired flight information or the current stock price can be retrieved therefrom on demand.

At this point, there are generally two methods of determining whether a user is permitted to establish access to such a database. In a first method, a database manager omits implementing its own security mechanisms, thus relying solely upon the security mechanisms inherent in the operating system of the database server. In this type of configuration, if a user wishes to connect to a database on a remote database server, the standard operating system's security checks are performed upon the user's request for access. If the user satisfies the operating system's security checks, then access is not only permitted to the server machine, but to the database itself.

An obvious drawback to this method is that rights granted by the operating system may exceed those needed to merely access the database. This situation creates unnecessary security risks if the remote user has only need to access the database, and has no reason or purpose in accessing anything else on the server.

To address the shortcomings of the first method, a second method provides that a database maintain its own file of valid users. When a remote user requests access to a database on a server, the remote user is checked against the file of valid users. Remote users found in the file are permitted access to the database on the server. In these database systems, a critical step in the security mechanism is to receive the user identification and the password and then verify that this combination is found in a repository of valid combinations of user identifications and passwords.

A problem with the second method is that the security mechanisms provided by database systems are typically not as secure as those provided by operating systems. Typically database systems merely check for valid combinations of user identifications and passwords. User identifications are most often based on names of users, names of projects, or some other easily guessed item related to the user. If a password is also selected in the same predictable manner, a hacker/infiltrator cannot only easily guess the valid password, but the whole combination. Consequently, database systems are often vulnerable to commonly known techniques of hacking computer systems.

Even more carefully generated passwords that are not susceptible to presumption are vulnerable. A hacker in possession of a stolen or inappropriately disseminated password who knows the associated user can easily guess at valid combinations of user identifications and passwords. A hacker can also employ computer automated methods of attempting numerous passwords based on common words or randomly generated strings of characters. Passwords consisting of a small number of characters are especially vulnerable. The smaller the number of characters the smaller number of permutations that have to be tried before uncovering the password.

Based on the foregoing, it is clearly desirable that a database system provide its own security features and forego reliance on the security mechanisms of the operating systems. It is further desirable that the database system employ security techniques that make the database system less vulnerable to infiltration than current database systems.

SUMMARY OF THE INVENTION

To address the above-discussed deficiencies of the prior art, it is a primary object of the present invention to provide systems for managing a database of selectable records, and methods of operating the same. According to one advantageous embodiment, a database administrator is provided for association with a computer system having distributed memory units.

The database administrator comprises a security controller and an access controller. The security controller operates repeatedly to (i) divide the database into portions and (ii) store ones of the portions to ones of the distributed memory units. The security controller thereby systematically redistributes the database over the distributed memory units. The access controller operates to repeatedly establish views of ones of the selectable records in response to the security controller redistributing portions of the database over the distributed memory units.

In a related embodiment, a computer system is introduced that comprises a database of selectable records, a plurality of networked computers and a database administrator. The plurality of networked computers are associated with distributed memory units. The database administrator operates to manage the database of selectable records, and, more particularly, is operable to repeatedly (i) divide the database into portions, (ii) store ones of the portions to ones of the distributed memory units to thereby systematically redistribute the database of selectable records over the distributed memory units and (iii) establish views of ones of the selectable records in response to redistributing the database over the distributed memory units.

According to a preferred implementation of the principles of the present invention, an electronic commerce system for monitoring communication of information by a company node to constituency nodes and analyzing constituency understanding and reaction to such information communication is also introduced.

According to an exemplary embodiment, the electronic commerce system, which is for use over a global communications network includes both company nodes and constituency nodes, comprises a database, a communications controller and a database administrator. The database is operable to store data files of selectable records associated with the company nodes, wherein the company nodes populate respective associated data files with commercial information. The communications controller is operable to (i) propagate communication interfaces accessible by the constituency nodes with selected portions of the commercial information under direction of the company nodes, and (ii) gather feedback information representative of constituency response to the constituency nodes accessing the communication interfaces. Advantageously, the company node, through the communications controller and associated database, is operable to provide an interactive system that enables the company to securely generate and near-continuously communicate information to its constituency via the global communications network, for instance the Internet.

The database administrator is associated with distributed memory units of the electronic commerce system, and comprises a security controller and an access controller. The security controller operates repeatedly to (i) divide the database into portions and (ii) store ones of the portions to ones of the distributed memory units, the security controller thereby systematically redistributes the database over the distributed memory units. The access controller that operates to repeatedly establish views of ones of the selectable records responsive to the security controller redistributing the database over the distributed memory units.

According to a related advantageous embodiment, the company node is also operable to store, index and relate the company's responses, detailing the past, present and future of the company and its relevant industry, all in the database. An important aspect of one such embodiment is the ability of the company node to control when publication (e.g., to fairly disseminate, distribute or otherwise make available) of at least selected portions of the information stored in the database is available to the constituencies. This may advantageously be accomplished through the communications controller which may suitably be arranged to enable the company node to modify one or more data records stored in the database, and to decide when such pending modified information is complete (e.g., technically, factually or legally accurate, thorough, or otherwise satisfactory for publication). Upon a determination of completion, the company node may direct the communications controller to publish such information from the data repository for access by the constituency nodes.

According to a yet further related embodiment, the company node monitors constituency understanding and reaction to the company's information communications and organizes this information into customizable, real-time analysis reports for the company. Further, the company's communications may suitably be translated by the communications controller into multiple languages, organized into audio or video presentations, or the like to assure visibility to the global community.

An important aspect thereof is the company node's ability to monitor segments of the constituency's understanding and reaction to information communication throughout the world. For instance, the company node is operable to facilitate development of high and low income statement forecasts by members of the financial community. Furthermore, the company, vis-a-vis the company node, is operable to develop a constituency, or sub-constituency, consensus estimate against which the company can comment their relative outlook.

Before undertaking more detailed discussions of preferred embodiments of the present invention, the meaning of the following terms and phrases should be understood: the term "or" is inclusive, meaning and/or; the term "include" and derivatives thereof mean inclusion without limitation; the phrase "associated with" and derivatives thereof may mean to include within, interconnect with, contain, be contained within, connect to or with, couple to or with, be communicable with, juxtapose, cooperate with, interleave, be a property of, be bound to or with, have, have a property of, or the like; and the term "controller" is defined broadly to include any implementation of the present invention, whether in software, firmware, hardware or at least two of the three.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which like numbers designate like objects and in which.

DETAILED DESCRIPTION

FIGS. 1 through 7, discussed below, and the various embodiments used to describe the principles of the present invention in this patent document are by way of illustration only and should not be construed in any way to limit the scope of the invention. Those skilled in the art will understand that the principles of the database management and related electronic commerce systems, as well as the methods of operating the same, set forth herein may be implemented over any suitably arranged communications network or system.

Figure 1:
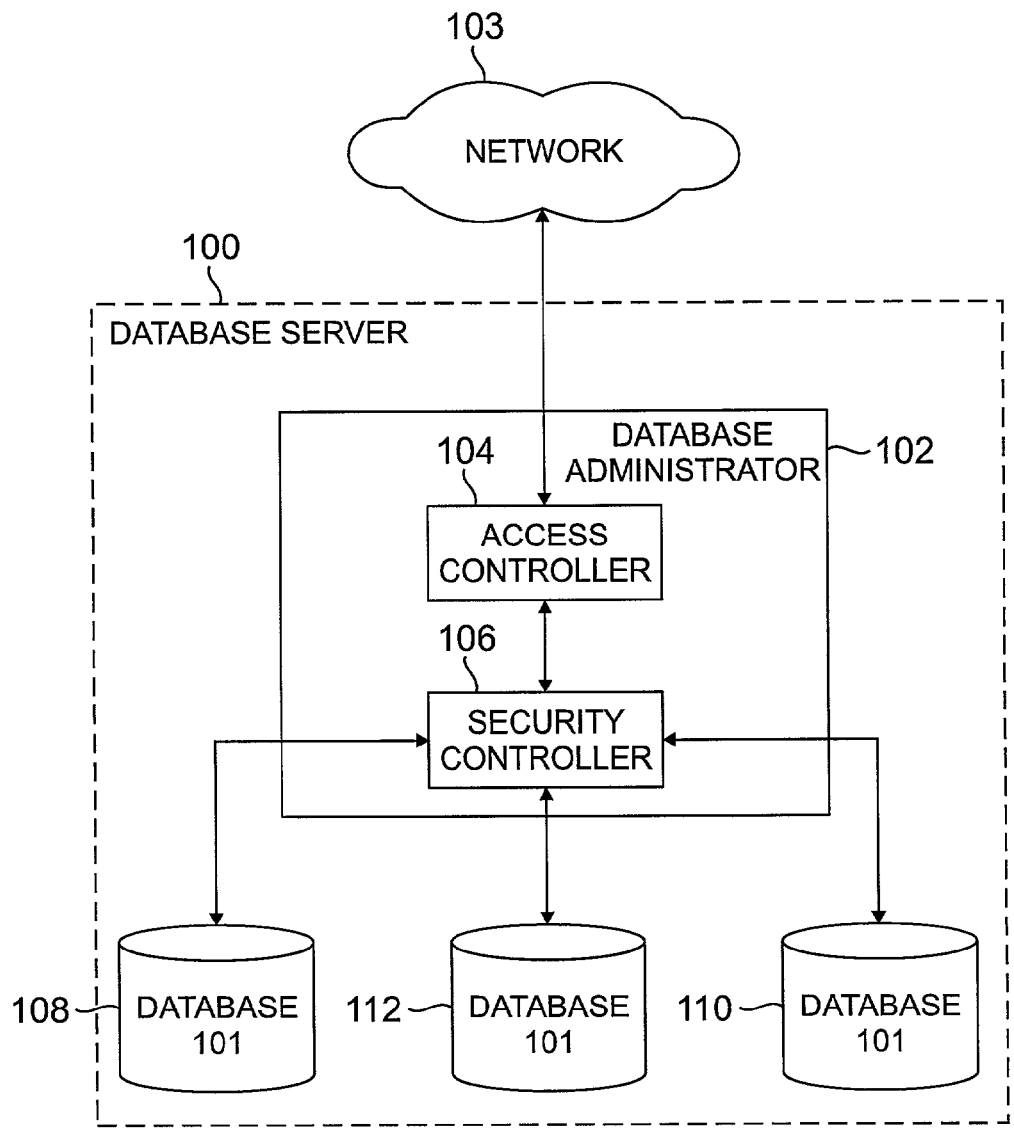
FIG. 1 illustrates a detailed block diagram of an exemplary database administrator in accordance with the principles of the present invention.

FIG. 1 illustrates a detailed block diagram of an exemplary database administrator 102 according to one embodiment of the present invention. Exemplary database administrator 102 illustratively resides on database server 100 and is associated with a plurality memory units 108-112. Database administrator 102 comprises a database 101, an access controller 104 and a security controller 106. Exemplary database 101 is broadly defined as a collection of information organized such that a suitably arranged computer program or other controller can quickly select desired data stored therein. Exemplary security controller 106 operates repeatedly to (i) divide database 101 into portions 101a-101n and (ii) store ones of portions 101a-101n to ones of distributed memory units 108-112. Security controller 106 systematically redistributes database 101 over distributed memory units 108-112. Exemplary access controller 104 operates to repeatedly establish views of ones of selectable records of database 101 in response to security controller 106 redistributing portions 101a-101n of database 101 over distributed memory units 108-112.

It will be appreciated by those of ordinary skill in the art, database 101 of selectable records, although shown as a single database, may, in point of fact, be any number of associated databases. A primary aspect of the principles hereof is that database administrator 102 and its ability, via security controller 106 and access controller 104, is to redistribute database 101 over a plurality of memory units 108-112. Data for entry into database 101 is received from a client via network connection 103 into access controller 104. That data is then passed to security controller 106 which then stores the data. Access controller 104 manages login and grants access to security controller 106.

Database administrator 102, via access controller 104 and security controller 106, provides a database management system ("DBMS") operable to control user entry, modification, organization, access/selection of data in database 101. Security controller 106 maintains the address of each data record in database 101 and may suitable be arranged to provide pointers to each data record managed by database administrator 102. Security controller 106 may utilize a tag or other indicia (referred to generally as a "tag") associated with each data record to track and identify the record as belonging to a particular data set, data subset, client, client type or any other item or group, whether application dependent or otherwise.

Tags follow associated data records to every location to which data record is redistributed/relocated. Exemplary security controller 106 periodically disassembles database 101 into groups of records or individual data records (i.e., portions 101a-101n) and distributes the same to distributed memory units 108-112. A "memory unit," for purposes hereof, can be defined broadly, as any suitably arranged memory/storage device, including a hard disk drive, a solid state disk, a redundant array of inexpensive disks ("RAID"), random access memory ("RAM") or the like. "Distributed memory unit," for purposes hereof, can be defined broadly, as any at least two physically separate memory units, whether locally or remotely; for instance, memory units 108-112 are locally associated with database server 100. In contrast, according to a related embodiment, a remotely distributed memory unit may be physically associated with another server, in a computer on a connected local area network, wide area network, a connected computer somewhere on the Internet or the like.

Exemplary security controller 106 maintains pointers to each data record in database 101 and as above-mentioned will periodically parse or disassemble the database into selectable records and store the records in different memory units 108-112. Security controller 106 may be programmed to parse the database in half, quarters, individual data records, or cells, or even, portions of different sizes. Security controller 106 divides (e.g., decompiles, disassembles, parses, etc.) database 101 on any periodic basis such as clock pulses generated by database server 100, a threshold number of accesses to database 101 or some portion thereof for any given time period, the time of day, time since the last divided, or any other measurable event. According to an alternate embodiment, division of database 101 may be randomly accomplished.

When an authorized user logs into database server 100, access controller 104 provides an authorized identity to security controller 106. Security controller 106 utilizes associated data record tags to provide the required data record to access controller 104. Access controller 104 may then assemble the data record into a predetermined format, for instance a spreadsheet, for the client to view. It should be noted that if a database divide step takes place during the use of the retrieved data, security controller 106 applies the appropriate tags to the individual data records or group of data records that are in use to maintain seamless interaction with the user.

To summarize, database administrator 102 instantiates database 101, possibly initially on a single one of memory units 108-112, or, even initially, distributed over multiple memory units 108-112. Database administrator 102 then receives, over time, client data for entry therein or modification thereto. Database 101 has a fluid state rather than a static state in that the records of data are repeatedly divided as portions of database 101 and stored to memory units 108-112, such that security controller 106 operates to redistribute portions 101a-101n of database 101 over ones of memory units 108-112. In short, relocating portions 101a-101n to different locations within a distributed memory unit system 108-112. Distributed memory units 108-112 are generally located in the database server itself, but again may be memory units associated with computers connected to the same local area network as the database server. Other configurations that may be used include storing selectable records on various memory units throughout a wide area network, an intranet or specific secured Internet memory units. The configuration of memory units for storing data records of the database can be any suitably arranged combination of local area networks, wide area networks, intranet, Internet or simply multiple memory units 108-112 on database server 100.

Login, to access controller 104, may cause information to be retrieved from a profile table to create code for linking appropriate data records for the user to view or modify. The profile table is initially created by the authorized user and information in the table is used at every login to create a login table that allows security control 106 to link the requested data records together to establish a view.

Figure 2:
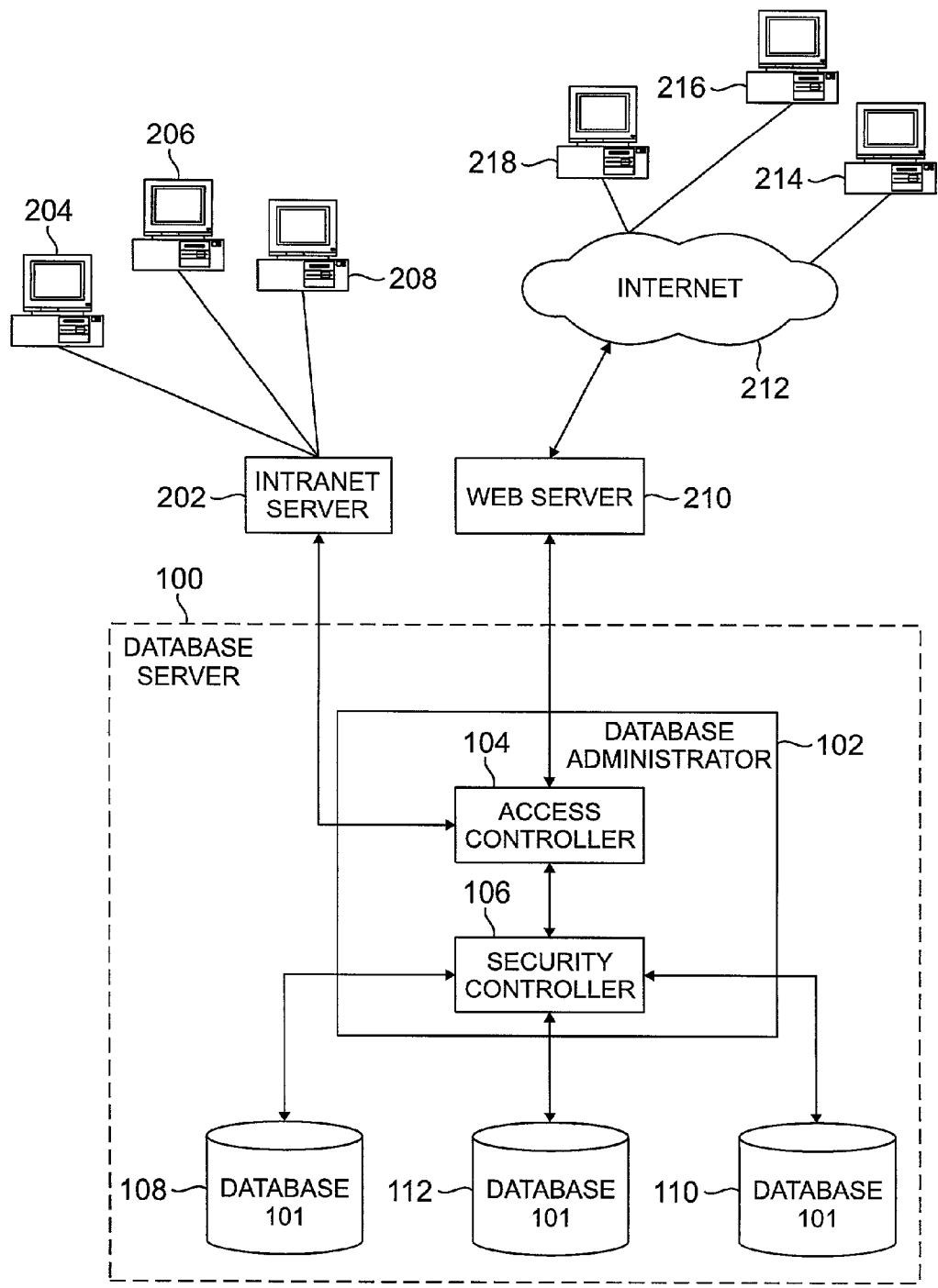
FIG. 2 illustrates a detailed block diagram of an exemplary computer system employing a database administrator in accordance with the principles of the present invention.

FIG. 2 illustrates a detailed block diagram of an exemplary computer system employing a database administrator 102 in accordance with the principles of the present invention. For purposes of illustration, concurrent reference is made to the embodiment of FIG. 1.

Exemplary database administrator 102 manages access controller 104 and security controller 106 to provide access to a client data maintained in database 101 and distributively stored across memory units 108-112. A client may view selective data records after a login controller (not shown) that allows authorized viewing of data cells that may be linked or otherwise associated and are assumed illustratively physically located on distributed memory units.

A client, or other user with authorization, may access the stored information via the Internet, local area network, wide area network, Intranet or any other network. For instance, a user at terminal 214 may access database server 100 via Internet 212 and web server 210. Access controller 104 operates, in any scenario, to repeatedly establish views of ones of the selectable records in response to security controller 106 redistributing portions 101a-101n of database 101 over distributed memory units 108-112.

Generally, a password or some sort of security is required before entry is allowed to database server 100. Further security measures are taken via access controller 104 which may also require a login procedure. Access to database information may further be secured by security controller 106 in that a login must be proper to enable access to data records. For instance, if a login is hacked or the login procedure is bypassed, access will be limited, if not rebuked, because linking of selectable data records is performed as a function of the proper login. A proper login provides a key to security controller 106 to provide all the proper links to data records for viewing.

According to the illustrated embodiment, a user at terminal 204 accesses Intranet server 202 which identifies the user and passes the request to database server 100. A security clearance is entered and user 204 is passed to database administrator 102 and access controller 104. The user then enters a login that is based on a previously created profile table and, if the login is correct, then the request for a view of data records is passed to security controller 106. Security controller 106 then assembles the appropriate data records from database portions 101a-101n from distributed memory units 108-112. The data records may be individually located or grouped on any of the depicted computers or storage devices including memory units 108-112, and possibly user computers 204-218.

Security controller 106, again, operates repeatedly to (i) divide database 101 into portions 101a-101n and (ii) store ones of portions 101a-101n to ones of distributed memory units 108-112—security controller 106 thereby systematically redistributing database 101 over distributed memory units 108-112. According to the present embodiment, security controller 106 periodically divides database 100 and relocates the individual data records singularly, or in groups to different distributed memory units. Security controller 106 is the only source for utilizing the key to the data link structure. If a data record or group of data records is accessed by an unauthorized user, there is no link available for the unauthorized user to view the other linked records. This prevents an unauthorized user from viewing all the data cells together.

Figure 3:
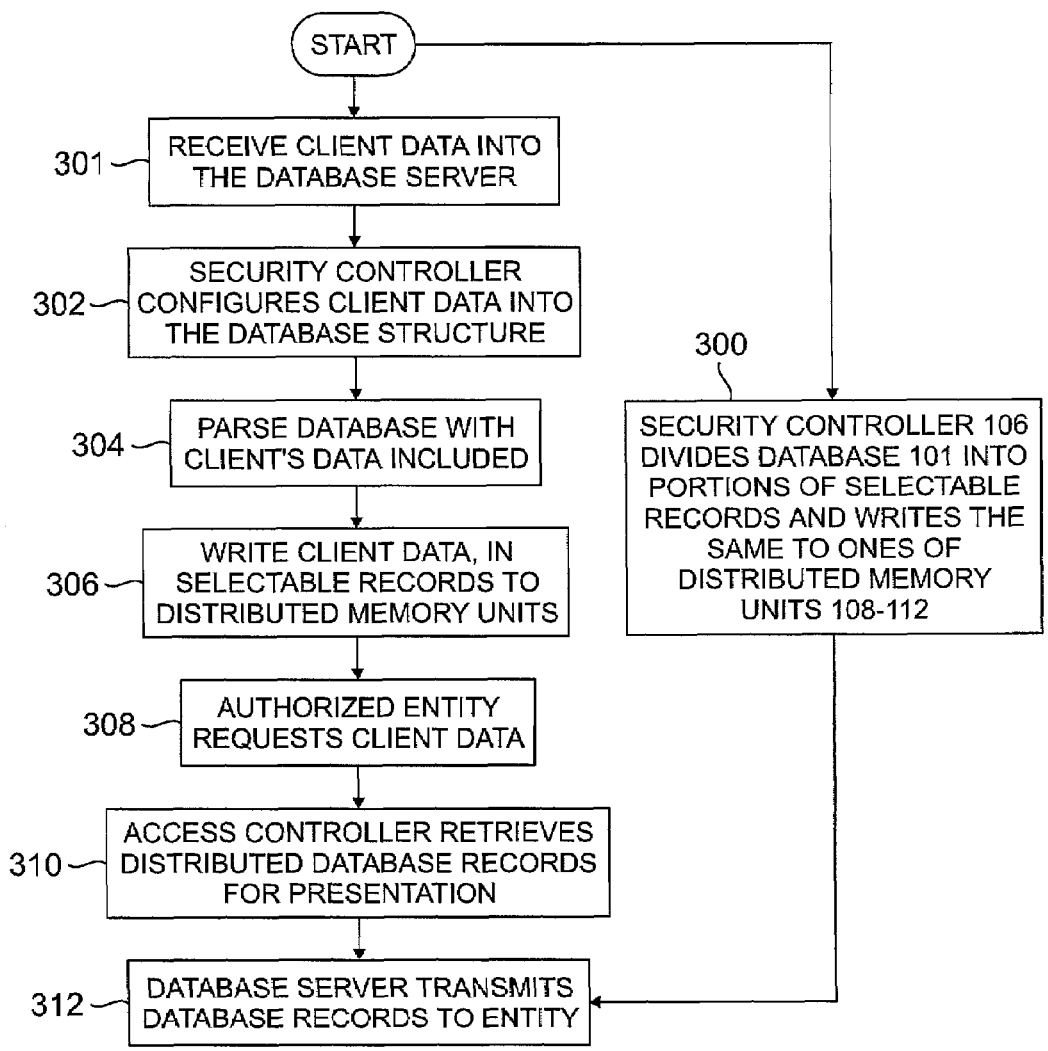
FIG. 3 illustrates a flow diagram of an exemplary method of operating the database administrator of FIGS. 1 and 2, all in accordance with the principles of the present invention.

FIG. 3 illustrates a flow diagram of an exemplary method of operating the database administrator of electronic commerce system as illustrated in FIG. 2, all in accordance with the principles of the present invention. Database 101 is continually being divided and selected records are distributed to one or more distributed memory units 108-112. Memory units 108-112 may be physically located on database server 100, on a different server in the same physical location or remotely on a connected local area network, wide area network, intranet, etc. Security controller 106 divides database into portions 101a-101n of selectable records and writes the same to distributed memory units 108-112. Subsequent redistribution of database 101 may be controlled by a computer clock pulse, the time of day, the number of hits on the database or any measurable event (process step 300).

A client enters data into the database via the database server 100 by logging into database administrator 102. Database administrator 102 receives the login entry into access controller 104. The login utilizes a profile table initially created by client information to construct security links for security controller 106 (process step 301).

Upon authorization, data may be entered, modified or deleted in database 101 by a client. Security controller 106 receives data entered by the client and adds the appropriate tags to each data record for tracking. Security controller 106 maintains a pointer to each record so that it may be relocated anywhere in a distributed memory unit system 108-112. The location of the data record is known and retrieval is easily accomplished (process step 302).

Security controller 106 divide database 101 into portions of selectable records and redistributes the same to over distributed memory units 108-112 (process step 304). The client data may suitable be divided and tagged for tracking while received during a suitably arranged input process. Security controller 106 then writes the portions of selectable records 101a-101n to the distributed memory units.

An authorized user may access the database with a proper login to view or modify previously entered data (process step 308). After verifying the login entry, access controller 104 passes the requested information (data cell views) to security controller 106. Security controller 106 utilizes the links established during data entry to retrieve the pertinent data cells. Security controller 106 then passes each data cell to access controller which configures the data cells (process step 310). Database server transmits the accumulated data cells to the entity for presentation (process step 312).

Figure 4A:
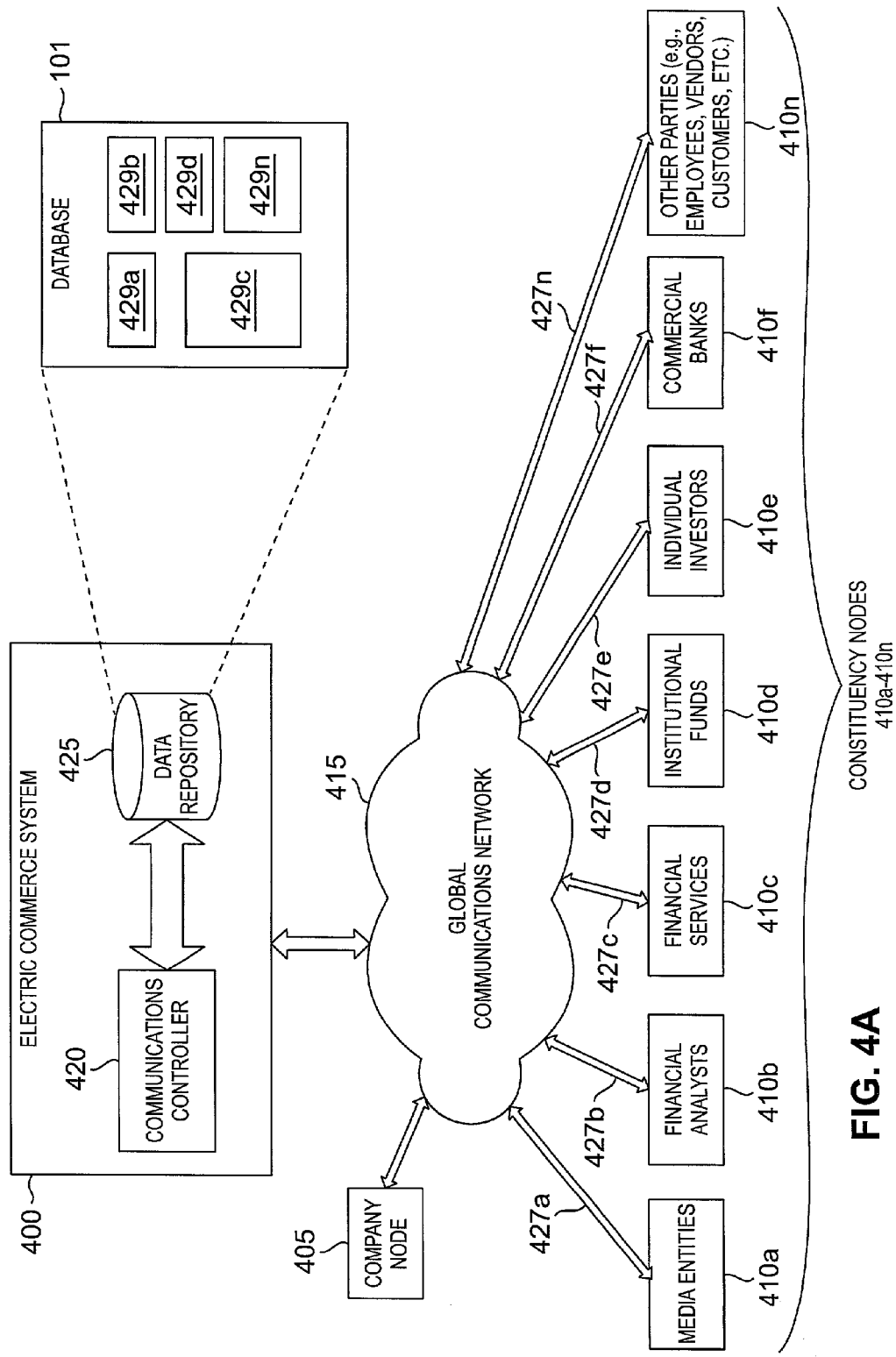
FIG. 4A illustrates a detailed block diagram of an exemplary electronic commerce system for monitoring communication of information by a company node to constituency nodes and for analyzing constituency understanding and reaction to such information communication, all in accordance with the principles of the present invention.

Referring now to FIG. 4A, illustrated is a detailed block diagram of an exemplary electronic commerce system 400 for monitoring communication of information by a company node 405 to constituency nodes 410a to 410n via a global communications network 415 and for analyzing understanding and reaction to such information communication by one or more of such constituency nodes 410a to 410n, all in accordance with the principles of the present invention.

As will be discussed in greater detail hereafter, a database management system will be introduced, along with methods of operating the same. Those skilled in the art should appreciate that the implementation of the foregoing database management system within exemplary electronic commerce system 400 is by way of example. In point of fact, the principles hereof may be implemented in any system wherein database security is an issue and the system allows for a database management system suitably arranged to systematically redistribute at least portions of at least one database over distributed memory units. Such a system might reasonably include financial systems, process control systems, secure transaction systems, physical security systems and the like. For the purposes hereof, the terms "node" and "electronic commerce system" are defined broadly to mean any suitable computer system, or network of computer systems, whether public or private, whether wired or wireless, and, with particular respect to "nodes," operating to perform the functions relevant either to the company node 405 or to at least one of the constituency nodes 410a to 410n.

Exemplary electronic commerce system 400 illustratively includes a communications controller 420 and a data repository 425 which includes database 101 (managed by a data administrator, an access controller and a security controller (introduced with reference to FIGS. 1 to 3)), and is broadly operative to provide:

(i) indexing and cross-referencing of company information by each subject of significance within data repository 425 to one or more constituencies;

(ii) an automated interface for placing or updating information disclosures on the communications conduit via global communications network 415 to constituency nodes 410a to 410n; and (iii) monitoring and analyzing one or more constituencies' understanding and reaction to such new or updated information disclosures using communications controller 420.

According to this embodiment, database administrator 102 of FIG. 1 (not shown) is associated with data repository 425 as well as a plurality of memory units. Database administrator 102 comprises a database 101, an access controller and a security controller. The security controller operates repeatedly to (i) divide database 101 into portions and (ii) store ones of portions to ones of distributed memory units. The security controller systematically redistributes database 101 over distributed memory units. The access controller operates to repeatedly establish views of ones of selectable records of database 101 in response to the security controller redistributing portions of database 101 over distributed memory units.

The exemplary constituency nodes illustratively include a media entities node 410a, a financial analysts node 410b, a financial services node 410c, institutional funds node 410d, an individual investors node 410e, a commercial banks node 410f and an other parties node 410n (e.g., employees, vendors, customers, affiliates, subsidiaries, etc.). Each of these exemplary nodes is operative to perform functions relevant to information processing and analysis needs, and more particularly:

(i) exemplary media entities node 410a is illustratively representative of one of many media entities nodes associated, or connected, with company node 405 via global communications network 415; the term "media," in this instance, is defined broadly to include any means of mass communication, such as newspapers, magazines, radio, television, or the like;

(ii) exemplary financial analysts node 410b is illustratively representative of one of many financial analysts nodes associated, or connected, with company node 405 via global communications network 415; the term "financial analyst,"

in this instance, is defined broadly to include any entity (e.g., person, company, etc.) skilled at analyzing the financial state of private or public companies or industry groups, and makes buy and sell recommendations on the securities of such companies or groups;

(iii) exemplary financial services node 410c is illustratively representative of one of many financial services nodes associated, or connected, with company node 405 via global communications network 415;

(iv) exemplary institutional funds node 410d is illustratively representative of one of many institutional funds nodes associated, or connected, with company node 405 via global communications network 415; the term "institutional fund," in this instance, is defined broadly to include any entity that publicly trades large volumes of securities via a public markets;

(v) exemplary individual investors node 410e is illustratively representative of one of many individual investors nodes associated, or connected, with company node 405 via global communications network 415; the term "individual investor," in this instance, is defined broadly to include any individual that publicly trades securities via a public markets or purchases securities of privately-held companies;

(vi) exemplary commercial banks node 410f is illustratively representative of one of many commercial banks nodes associated, or connected, with company node 405 via global communications network 415; the term "commercial bank," in this instance, is defined broadly to include any entity that keeps money for saving or commercial purposes or is invested, supplied for loans, or exchanged; and (vii) exemplary other parties node 410n is illustratively representative of one of many employees, vendors, customers, affiliates, subsidiaries, or the like associated, or connected, with company node 405 via global communications network 415; and wherein, according to a related embodiment, one or more of these other parties may have controlled access to information within database 101 that is not published for general constituency access.

Finally, exemplary global communications network 415 is a wide area network that links together many thousands of smaller sub-networks, for instance, the Internet. These sub-networks are owned by different businesses, government entities, universities, and other organizations, all of which collectively include the constituencies.

According to an exemplary embodiment, electronic commerce system 400 uses global communications network 415 as a backbone to facilitate communications by and between company nodes (here, only company node 405) and constituency nodes 410. Exemplary data repository 425 is operable to store data files 429a to 429n, as a portion of database 101, associated with the company nodes 405, wherein the company nodes 405 populate respective associated data files 429 with commercial information. Exemplary communications controller 420 is operable to (i) propagate constituency, or, more broadly, communication, interfaces 427a to 427n accessible by constituency nodes 410 with selected portions of the commercial information under direction of company nodes 405, and (ii) gather feedback information representative of constituency response to constituency nodes 410 accessing communication interfaces 427. It is understood that each of communication interfaces 427 is operable to associate, directly or indirectly, ones of company nodes 405, constituency nodes 410 and electronic commerce system 400, whereby such association facilitates communication of such commercial information in at least one of a wired or a wireless connection, including electric, magnetic or optic formats.

Advantageously, electronic commerce system 400, through communications controller 420, associated data repository 425 and database 101, is operable to provide an interactive system that enables the company to generate and near-continuously communicate information fairly to its constituency via global communications network 415, for instance the Internet. Company node 405 is further operable to store, index and relate the company's responses, detailing the past, present and future of the company and its relevant industry, all via communications controller 420, associated data repository 425 and database 101.

According to the present embodiment, company node 405 is operable to control "when" publication (e.g., fair dissemination, distribution or other availability) of at least selected portions of the information stored in database 101 is available to constituency nodes 410. This may advantageously be accomplished through communications controller 420 which is illustratively arranged to enable company node 405 to modify one or more data records 429 stored in database 101, and to decide when such pending modified commercial information is complete (e.g., technically, factually or legally accurate, thorough, or otherwise satisfactory for publication). Upon a determination of completion, company node 405 may direct communications controller 420 to publish such information from database 101 for access by constituency nodes 410. The foregoing feature ensures that "draft"-type versions of commercial information is not disseminated prematurely.

It is important to note that the functionality of electronic commerce system 400 above-described may suitably be implemented centrally, in a single computer system or network of computer systems, or distributed over multiple associated computer systems or network of computer systems. For instance, upon installation, electronic commerce system 400 may, in part, be instantiated on ones of company nodes 405 and constituency nodes 410.

Figure 4B:
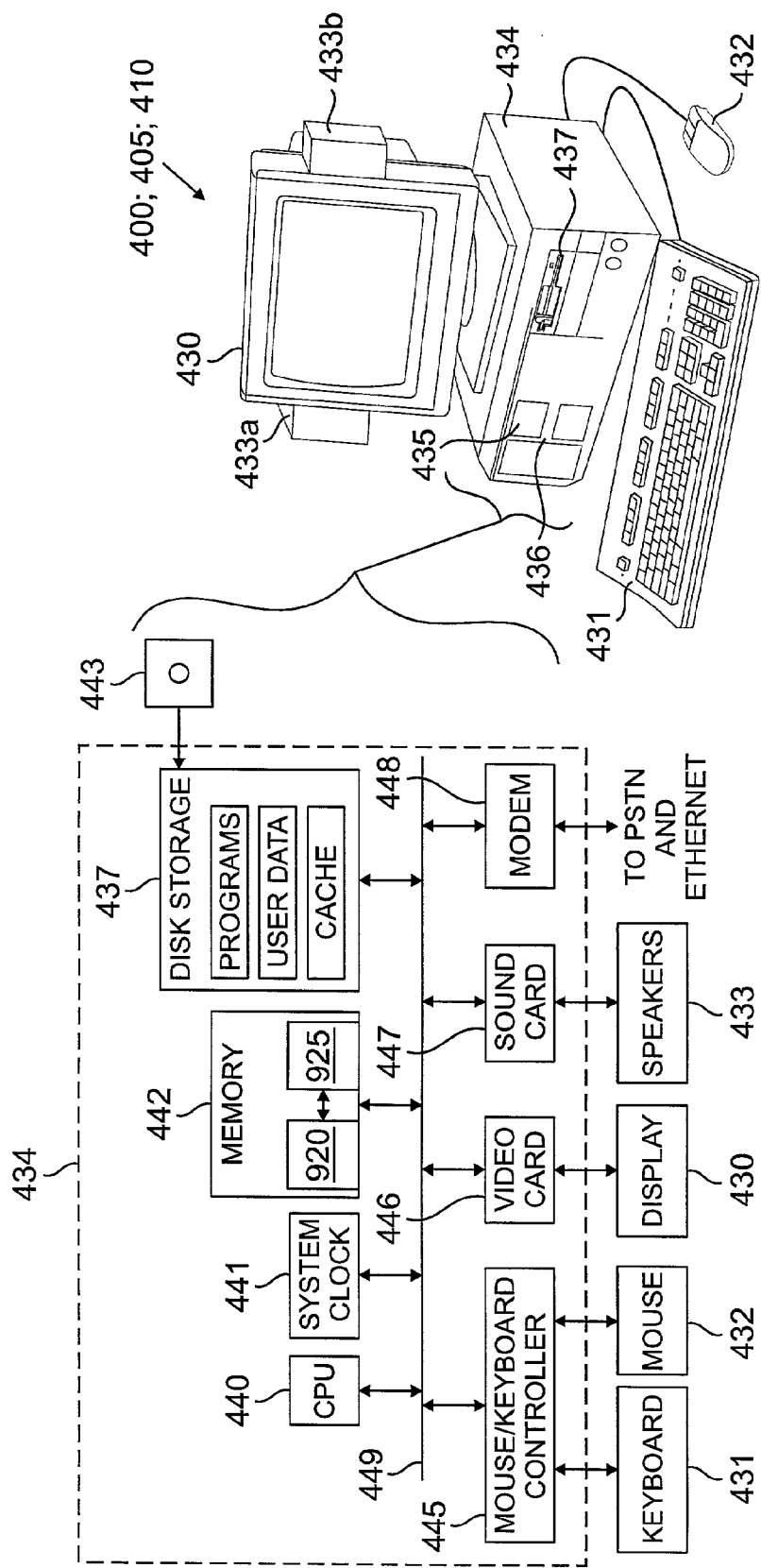
FIG. 4B illustrates an isometric view of an exemplary computer system that may suitably be used as the electronic commerce system, the company node or any of the constituency nodes of FIG. 4A, all in accordance with the principles of the present invention.

Referring next to FIG. 4B, illustrated is an isometric view of an exemplary computer system (generally designated 400; 405; 410), such as a personal computer system ("PC") for example, that may suitably be arranged to function as electronic commerce system 400, company node 405 or any of constituency nodes 410a to 410n, all according to the principles of the present invention. For the purposes of illustration, concurrent reference is made to FIG. 4A.

Exemplary PC 400; 405; 410 is illustratively associated with a display device 430, keyboard 431, mouse 432, and speakers 433a and 433b, which operate to allow communication between PC 400; 405; 410 and a user (not shown). Exemplary display device 430 provides a screen area for display of graphical data under the control of an exemplary graphical user interface ("GUI") operating system (O/S) and browser application executing within PC 400; 405; 410. The exemplary GUI operating system manages division of computation logic resources among various application tasks executing in PC 400; 405; 410. The GUI operating system may divide the screen of display device 405 into a plurality of suitably arranged windows that display data corresponding to each of the application tasks.

PC 400; 405; 410 is further associated with a chassis 434, a dedicated hardware reset switch 435, a power switch 436 and a floppy disk drive 437. PC 400; 405; 410 illustratively includes within chassis 434 various electronic components, namely, a central processing unit ("CPU") 440, system clock 441, and memory 442, which typically comprises volatile RAM memory capable of storing, in the case of electronic commerce system 400, for example, (i) database 101 and (ii)

software instructions that are retrievable and executable by CPU 440 to instantiate communications controller 420.

PC 400; 405; 410 also comprises disk storage device 437. Disk storage device 437 is representative of one or more readable/writeable fixed storage devices, such as a hard drive, or removable storage devices capable of receiving removable storage media 443, which may comprise, for example, a floppy disk, a ZIP disk, a CD-ROM disk, a DVD disk, etc. In an advantageous embodiment of the present invention, removable storage media 443 may be used to store, in the case of electronic commerce system 400, (i) at least a portion of database 101 or (ii) at least a portion of the software instructions that are retrievable and executable by CPU 440 to instantiate communications controller 420.

PC 400; 405; 410 also comprises mouse/keyboard controller 445, video card 446, sound card 447, and modem 448. The various components of PC 400; 405; 410 transfer data and control signals across bus 449. The user inputs data and commands to PC 400; 405; 410 via mouse/keyboard controller 445, which provides an interface between keyboard 431 and mouse 432 and CPU 440. Exemplary modem 448 provides a communication interface between PC 400; 405; 410 and global communications network 415 (possibly via a publicly switched telephone network ("PSTN"); in alternate embodiments, modem 448 may be any suitably arranged network connectivity device that facilitates communication (wired or wireless) between PC 400; 405; 410 and other nodes associated with global communications network 415). The GUI operating system of PC 400; 405; 410 transfers browser application screens and web page images to display device 430 via video card 446.

Those skilled in the pertinent art will note that the principles of the present invention may be implemented in any suitable computer system environment, whether micro, mini, mainframe, super or like computers systems, including multi and parallel processing environments, wireless implementations using webphones, personal data assistants ("PDAs") or the like, as well as computer system networks. To that end, conventional computer system architecture is more fully discussed in THE INDISPENSABLE PC HARDWARE BOOK, by Hans-Peter Messmer, Addison Wesley (2nd ed. 1995) and COMPUTER ORGANIZATION AND ARCHITECTURE, by William Stallings, MacMillan Publishing Co. (3rd ed. 1993); conventional computer and communications network design is more fully discussed in DATA NETWORK DESIGN, by Darren L. Spohn, McGraw-Hill, Inc. (1993); conventional data communication is more fully discussed in VOICE AND DATA COMMUNICATIONS HANDBOOK, by Bud Bates and Donald Gregory, McGraw-Hill, Inc. (1996); DATA COMMUNICATIONS PRINCIPLES, by R. D. Gitlin, J. F. Hayes and S. B. Weinstein, Plenum Press (1992); and THE IRWIN HANDBOOK OF TELECOMMUNICATIONS, by James Harry Green, Irwin Professional Publishing (2nd ed. 1992). Each of the foregoing publications is incorporated herein by reference for all purposes.

It should be noted that use of the Internet is but an example of global communications network 415 in accordance with the principles hereof, the information, or content, on the sub-networks comprising the same is accessible to outside parties by means of the World Wide Web (the "Web"). The Web comprises software, standardized protocols, and other widely-accepted conventions that enable a computer user (or constituency) to browse (or navigate) through the vast amounts of data content, and with respect to the present invention, through the vast amounts of data content resident on the computer system (e.g., computer(s), server(s), sub-sub-networks) of electronic commerce system 400.

Figure 4C:
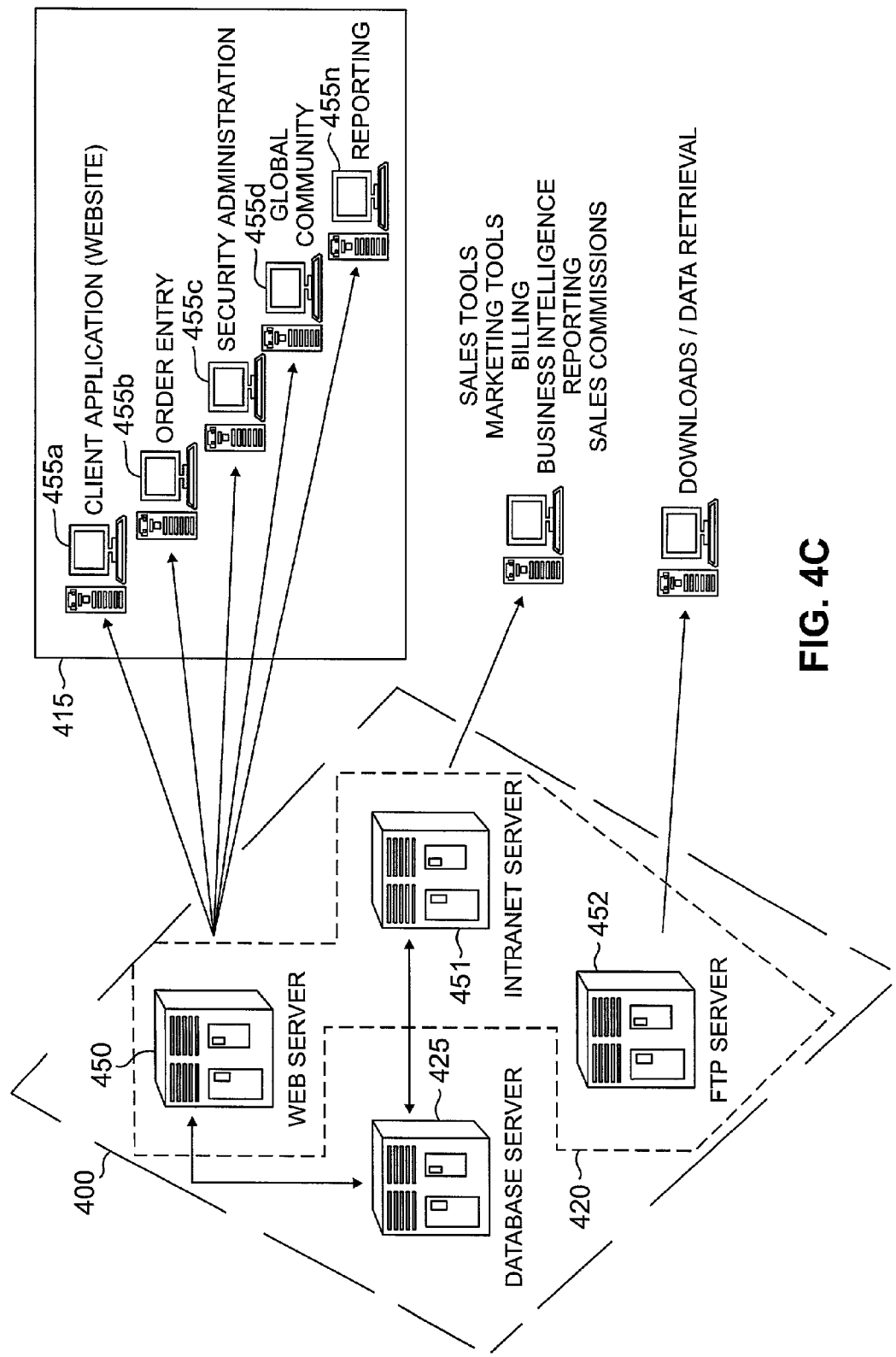
FIG. 4C illustrates a detailed block diagram of an exemplary hardware architecture of the electronic commerce system of FIG. 1A, all in accordance with the principles of the present invention.

Referring next to FIG. 4C, illustrated is a detailed block diagram of an exemplary hardware architecture of electronic commerce system 400 of FIG. 4A, all in accordance with the principles of the present invention. Again, concurrent reference is made to the discussion of FIG. 4A for purposes of illustration.

Exemplary electronic commerce system 400 illustratively includes a communications controller 420, data repository 425 and database 101, which database 101 again may suitably be centralized or distributed, whether in whole or in part. Exemplary communications controller 420 comprises a web server 450, an intranet server 451 and a FTP server 452, and exemplary database 101 illustratively includes a database server.

Exemplary web server 450 is operable to transfer/deliver Web pages over global communications network 415. Exemplary intranet server 451 is operable to transfer/deliver Web pages and other information via a privatized network belonging to an organization, for instance the "company," and is accessible only by the organization's subscribers, members, employees, or others with authorization; the intranet's Web sites look and operate similar to any other Web site, but a firewall associated with the intranet server 451 fends off unauthorized access. Exemplary FTP server 452 is operable to transfer information files via global communications network 415.

According to the illustrated embodiment, web server 450, intranet server 451, FTP server 452 and data repository 425 cooperate to monitor and to control communication of information by electronic commerce system 400 on behalf of company node 405 to constituency nodes 410a to 410n, to develop through subscriber/member interaction company specific information for selective fair communication to constituency nodes 410a to 440n, and to analyze constituency understanding and reaction to such information communication.

Web server 450 provides a plurality of interfaces over global communications network 415, including client application interface 455a, order entry interface 455b, security administration interface 455c, global community interface 455d, and reporting interface 455n. Company node 405 is operable, vis-a-vis the foregoing interfaces, to store, index and relate the company's responses, detailing past, present and future of the company and its relevant industry. In a related embodiment, information communications may suitably be translated by communications controller 420 into multiple languages, organized into audio or video presentations, or the like to assure visibility to the global community for maximum dissemination.

Again, it is important to note that exemplary company node 405 is operable to control when publication of at least selected portions of the information stored in database 101 is to be made available to the constituencies. Communications controller 420 enables company node 405 to modify one or more data files 429 stored in database 101, and to decide when such pending modified information is complete. Upon a determination of completion, company node 405 may direct communications controller 420 to publish such information from database 101 for access by constituency nodes 410.

Intranet server 451 provides a plurality of sub-controllers, including sub-controllers operable to provide sales tools, marketing tools, billing tools, business intelligence, reporting, sales commissions, etc., ones of which that cooperatively monitor constituency understanding and reaction to information communications of the company and which operates to organize this information into customizable, real-time analysis reports for the company.

An important aspect thereof is the functionality of electronic commerce system 400 to monitor segments of ones of constituency nodes 410a to 410n to understand and reaction to information communication. For instance, electronic commerce system 400 is operable to develop a constituency, or sub-constituency, consensus estimate that operates to guide members of the financial community in developing high and low income statement forecasts against which the organization or company can comment their relative outlook.

Figure 5A:
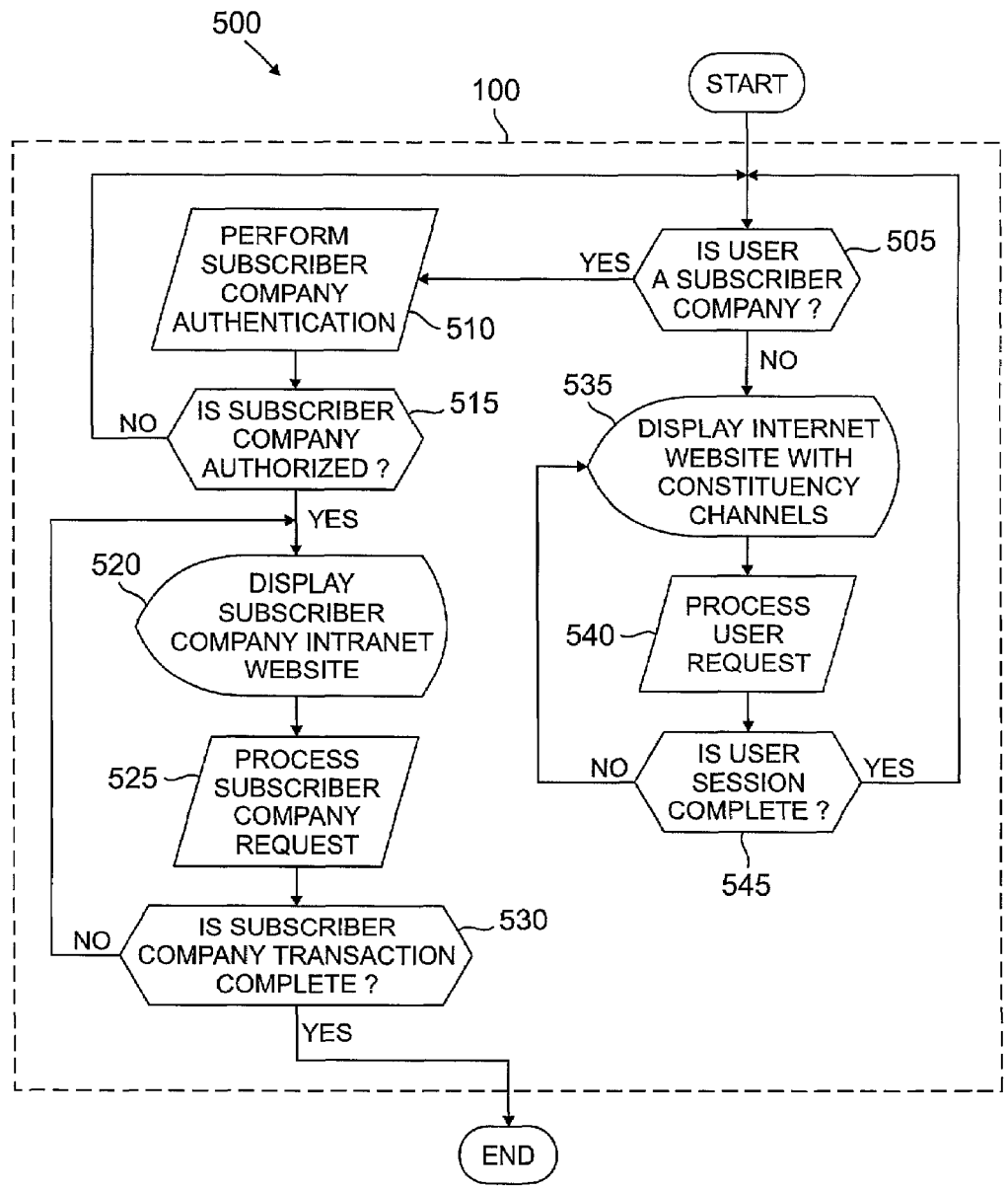
FIG. 5A illustrates a flow diagram of an exemplary method of operating the electronic commerce system of FIG. 4 for monitoring communication of information by the company node to ones of constituency nodes via a global communications network, all in accordance with the principles of the present invention.

Referring next to FIG. 5A, illustrated is a flow diagram (generally designated 500) of an exemplary method of operating electronic commerce system 400 for monitoring and controlling communication of information by company node 405 to ones of constituency nodes 410a to 410n via a global communications network 415 and for analyzing and understanding reaction to such information communication by one or more of such ones of constituency nodes 410a to 410n, all in accordance with the principles of the present invention. For purposes of illustration, concurrent reference is made to FIGS. 4A to 4C.

To begin, communications controller 420 of electronic commerce system 400 determines whether a current user is a subscriber company (e.g., company node 405) and, if so ("Y" branch of decision step 505), performs subscriber company authorization (process step 510). According to the illustrated embodiment, one advantageous method for performing subscriber company authorization involves a conventional multi-level password protection scheme (e.g., public/private key scheme, etc.), though any suitably arranged system that limits, with respect to those data files 429 associated with the subscriber company, access to the same to designated personnel of the subscriber company. In a related exemplary embodiment, performing subscriber company authorization includes an interactive voice recognition ("IVR") system. The IVR system is operable to verify the identity of such select designated personnel of the subscriber company (exemplary embodiment is discussed with reference to FIG. 4).

If current user is an authorized subscriber company ("Y" branch of decision step 515), communications controller 420 (i) displays a selected view of a portion of database 101 as a function of identifying the subscriber company (process step 520), and (ii) processes subscriber company request to review, modify or otherwise process the selected view of the portion of database 101 (process step 525); namely, select ones of data files 429.

An important aspect of note again is that multiple versions of various ones of data files 429 may suitably be maintained to reflect varying stages of communications in process (i.e., additions, modifications, etc. to commercial information) prior to publication for accessability by constituency nodes 410. Exemplary company node 405 is operable through communications controller 420 to provide an interactive system that enables the company to generate and near-continuously communicate information to its constituency via global communications network 415.

Figure 5B:
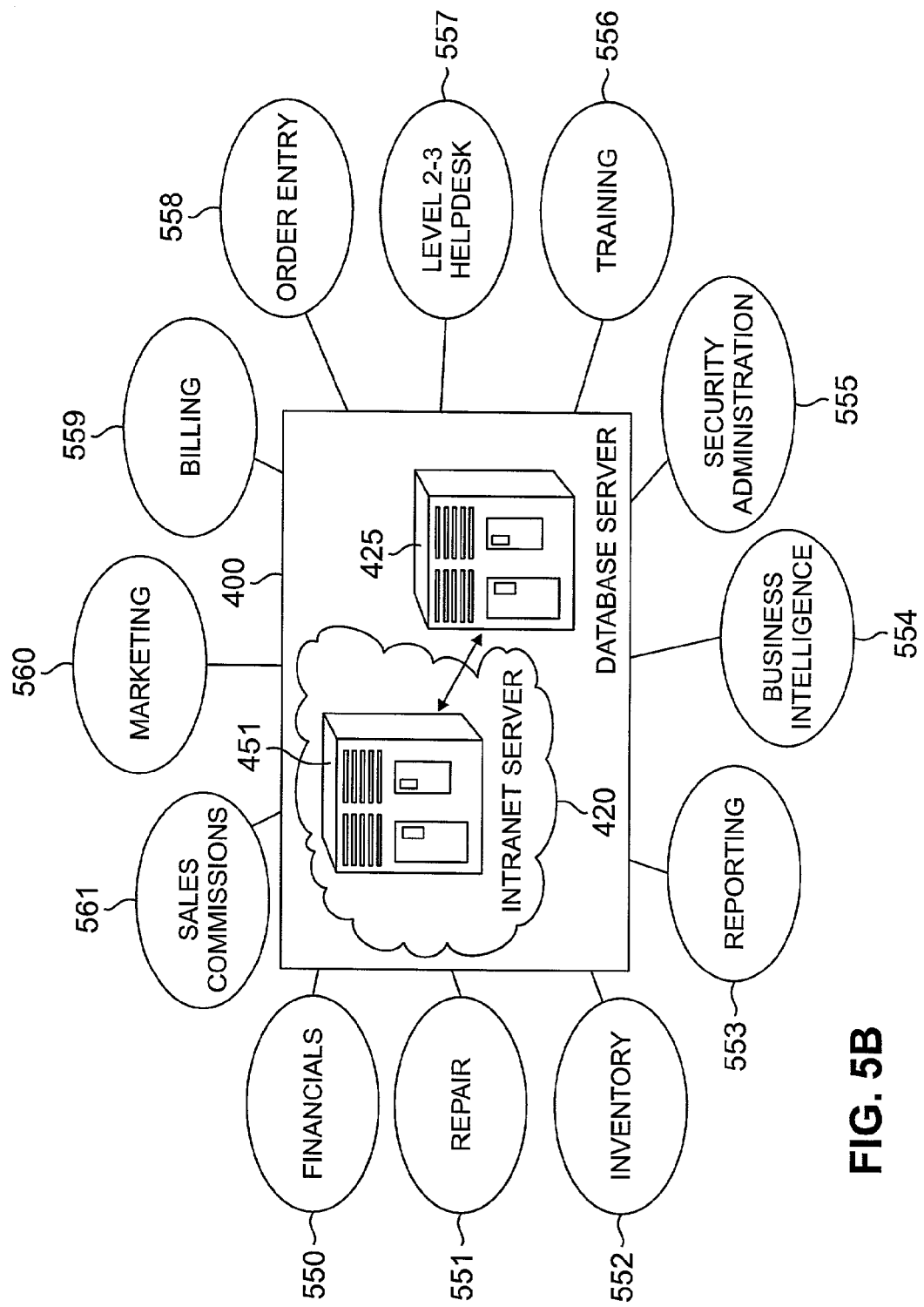
FIG. 5B illustrates a conceptual block diagram of a selected view of the portion of a data repository generated as a function of identifying a subscriber company, all in accordance with the principles of the present invention.

Referring momentarily to FIG. 5B, illustrated is a conceptual block diagram of the selected view of the portion of database 101 generated as a function of identifying the subscriber company (here, via company node 405) and displayed at an intranet web site intranet server 451. The selected view of the portion of database 101 displayed at the intranet web site illustratively includes financials sub-portion 550, repair sub-portion 551 inventory sub-portion 552, reporting sub-portion 553, business intelligence sub-portion 554, security administration sub-portion 555, training sub-portion 556, helpdesk sub-portion 557, order entry sub-portion 560, and sales commissions sub-portion 561. The foregoing is introduced by way of example and is neither considered an exclusive nor an inclusive representation of possible sub-portions. An important aspect hereof is that electronic commerce system 400, via communications controller 420 and data repository 425, provides a subscriber company with (i) standardized database 101 that indexes and cross-references company information stored in ones of data files 429 by subject and available to one or more constituencies, and (ii) an interface between company node 405 and electronic commerce system 400 that enables the subscriber company to place or update information disclosures on the communications conduit, e.g., constituency interfaces 427. Further, data repository 425 is associated with database 101 and includes a suitably arranged secure access database management system in accordance with the principles of the present invention described with reference to the embodiment of FIGS. 1-3.

Referring again to the discussion of FIG. 5A, if communications controller 420 determines whether a current user is not a subscriber company (e.g., constituency node 410a to 410n; "N" branch of decision step 505), communications controller 420 (i) displays a selected view of a portion of database 101 as a function of identifying the constituency node 410 (process step 535; preferably the interface is a web site or portion of a web site), and (ii) processes constituency node 410 request to review or otherwise process the selected view of the portion of database 101 (process step 540). Through communications controller 420, a constituency node 410 is thereby operable to view company generated information communications or commercial information through constituency interface 427 via global communications network 415.

Figure 5C:
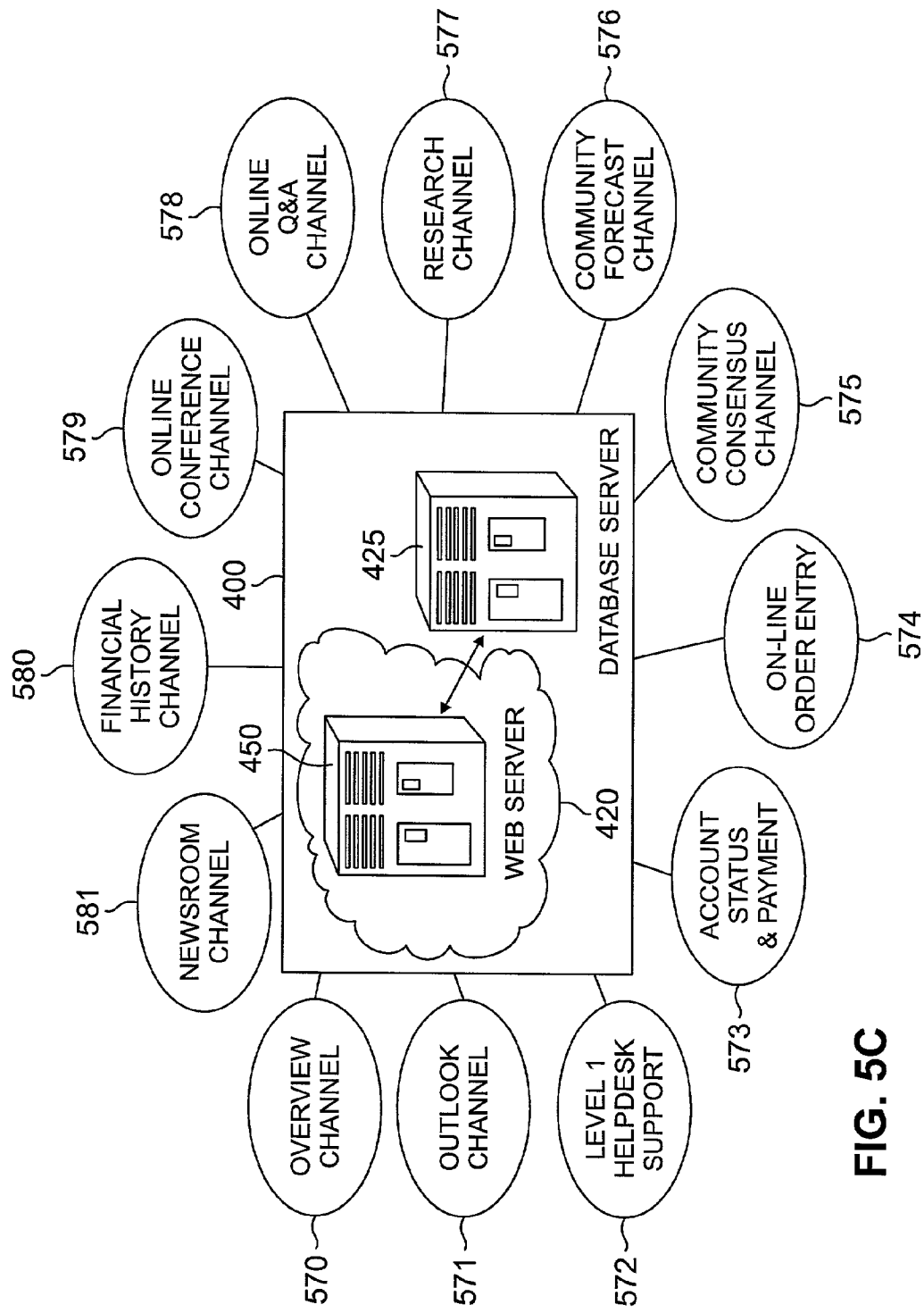
FIG. 5C illustrate is a conceptual block diagram of a selected view of the portion of database 101 generated as a function of identifying a constituency node, all in accordance with the principles of the present invention.

Turning momentarily to FIG. 5C, illustrated is a conceptual block diagram of the selected view of the portion of database 101 generated as a function of identifying the constituency node 410 (identified by specific constituency node, constituency-node type, etc.) and displayed at an Internet web site via constituency interface 427. Data repository 425 is associated with database 101 and includes a suitably arranged secure access database management system in accordance with the principles of the present invention described with reference to the embodiment of FIGS. 1-3. The selected view of the portion of database 101 displayed at the Internet web site is illustratively organized and indexed into "channels," wherein each channel includes all relevant topics made accessible through detailed outlines, for instance, overview channel 570, outlook channel 571, helpdesk support 572, account status and payment 573, online order entry 574, community consensus channel 575, community forecast channel 576, research channel 577, online q&a channel 578, online conference channel 579, financial history channel 580 and newsroom channel 581. For the purposes hereof, the term "channel" is defined broadly to include any communications path between two or more nodes or electronic commerce systems wherein such communications path may suitably refer to a physical medium (e.g., the wires) or to a set of properties distinguishing one channel from another channel; for instance, channels may refer to particular frequencies at which radio waves are transmitted, to specific discussions/communications between two or more nodes or electronic commerce systems, or the like.

Exemplary overview channel 570 is operable to provide an up-to-date and detailed outline addressing a given company's operations, industry and positioning. Exemplary outlook channel 571 is operable to provide a detailed discussion on future opportunities and risks associated with revenue and expense categories. Exemplary helpdesk support 572 is operable to provide a suitable means for providing help support to visiting constituencies. Exemplary account status and payment 573 is operable to provide a suitable means for providing account status and payment information. Exemplary online order entry 574 is operable to provide a suitable means for enabling a visiting constituency to order particular information, such as company reports, for instance.

Exemplary community consensus channel 575 is operable to aggregate the upside and downside consensus forecasts upon which subscriber company management can communicate their relative outlook, if desired, enabling the subscriber company the ability to discuss a range for future performance. Exemplary community forecast channel 576 is operable to receive upside and downside consensus income statement estimates from the constituency community, allowing the community to quantify their understanding and expectation of future operations against which the management can communicate their relative views.

Exemplary research channel 577 is operable to provide, in conjunction with the other channels, securities research data wherein reports are automatically generated by pulling information from other channels and organization it into a professionally formatted research style report. Exemplary online Q&A channel 578 is operable to provide a real-time information exchange with searchable archives, enabling the constituency to quickly access relevant questions facing a company along with management's responses. Exemplary online conference channel 579 is operable to provide interactive conferences, forums and interviews administrated by the company. Exemplary financial history channel 580 is operable to provide historical financial results, enabling the company to adjust or remove revenues or expenses outside of the normal course of business, giving an "apples-to-apples" history. Exemplary newsroom channel 581 is operable to provide a depository of information relating to the company and its industry, such as press releases, articles and video clips. Each submission in this channel may be associated with a commentary by management discussing its relevance to the company.

Figure 5D:
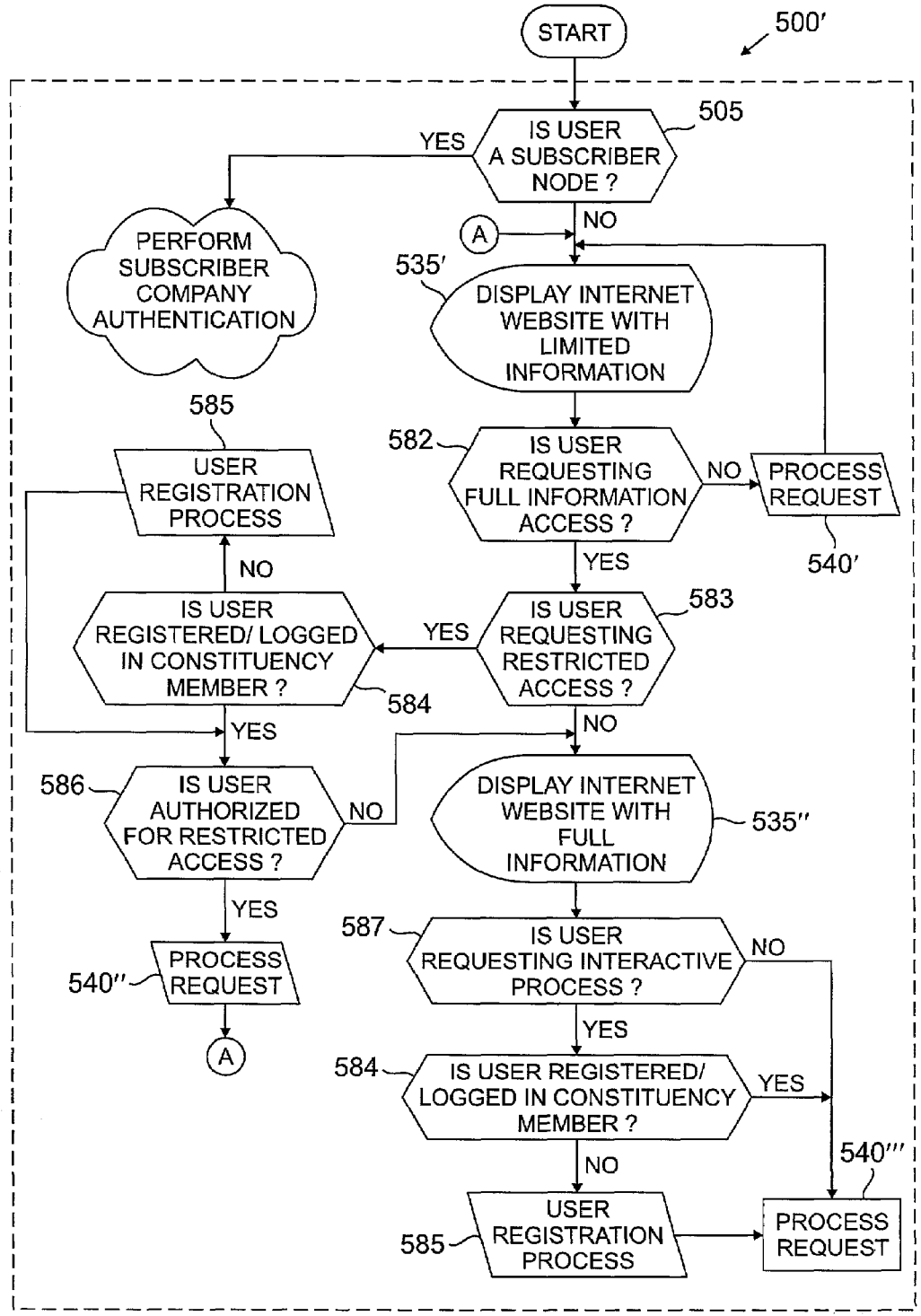
FIG. 5D illustrates a detailed flow diagram of an advantageous method of operating electronic commerce system of FIG. 4A for monitoring and controlling communication of information by the company node to ones of the constituency nodes via the global communications network and for analyzing and understanding reaction to such information communication by one or more of such constituency nodes, all in accordance with the principles of the present invention.

Referring next to FIG. 5D, illustrated is a more detailed flow diagram (generally designated 500') of an exemplary advantageous method of operating electronic commerce system 400 for monitoring and controlling communication of information by company node 405 to ones of constituency nodes 410a to 410n via a global communications network 415 and for analyzing and understanding reaction to such information communication by one or more of such ones of constituency nodes 410a to 410n, all in accordance with the principles of the present invention. For purposes of illustration, concurrent reference is made to FIGS. 4A to 5C.

To begin, communications controller 420 of electronic commerce system 400 determines whether a current user is a subscriber company (e.g., company node 405) and, if so ("Y" branch of decision step 505), performs subscriber company authorization, for instance, possibly as set forth hereinabove with reference to FIG. 5A. However, if communications controller 420 determines that a current user is not a subscriber company (e.g., constituency node 410a to 410n; "N" branch of decision step 505), communications controller 420 displays a selected view of a portion of database 101—limited information (process step 535'). Database 101 is associated with Data repository 425 which includes a suitably arranged, secure access database management system according to the principles of the present invention as described with reference to the embodiment of FIGS. 1-3.

Communications controller 420, in response to a user request, determines whether current user has requested full information access and, if not ("N" branch of decision step 582), processes current user request to review or otherwise process the selected view of the portion of database 101 (process step 540').

If communications controller 420, however, determines that the current user has requested full information access ("Y" branch of decision step 582), communications controller 420 determines whether the current user has requested access to restricted information (e.g., access limited to employees, vendors, customers, affiliates, subsidiaries, or the like associated, or connected, with a particular company; for instance, with respect to an employee, the requested restricted access may suitably be to the company's human resources ("HR") system, possibly via a web page (whether Internet or intranet)). If communications controller 420 determines that the current user has requested access to restricted information ("Y" branch of decision step 583), communications controller 420 determines whether the current user is a logged-in/registered constituency member.

If communications controller 420 determines that the current user is not a logged-in/registered constituency member ("N" branch of decision step 584), communications controller 420 logs in/registers the current user (process step 585). Communications controller 420 determines whether the current user, that is logged-in/registered, is authorized for restricted access to company restricted access information and, if so ("Y" branch of decision step 586), processes current user request to review or otherwise process the selected view of the portion of database 101 associated with restricted access (process step 540").

If communications controller 420 determines either that (i) the current user has not requested access to restricted information ("N" branch of decision step 583) or (ii) the current user, that is logged-in/registered, is not authorized for restricted access to company restricted access information ("N" branch of decision step 586), communications controller 420 displays a selected view of a portion of database 101—full information (process step 535"). Communications controller 420 determines whether the current user is requesting an interactive process (e.g., interaction with on-line Q&A channel 578, etc.) and, if not ("N" branch of decision step 587), communications controller 420 processes the current user request to review or otherwise process the selected view of the portion of database 101 associated with full information access (process step 540''').

Otherwise ("Y" branch of decision step 587), communications controller 420 determines whether the current user is a logged-in/registered constituency member and, if not ("N" branch of decision step 584), communications controller 420 logs in/registers the current user (process step 585). Communications controller 420 processes the current user, that is logged-in/registered, request interact with electronic commerce system 400 while reviewing or otherwise processing the selected view of the portion of database 101 associated with full information access (process step 540''').

Figure 6A:
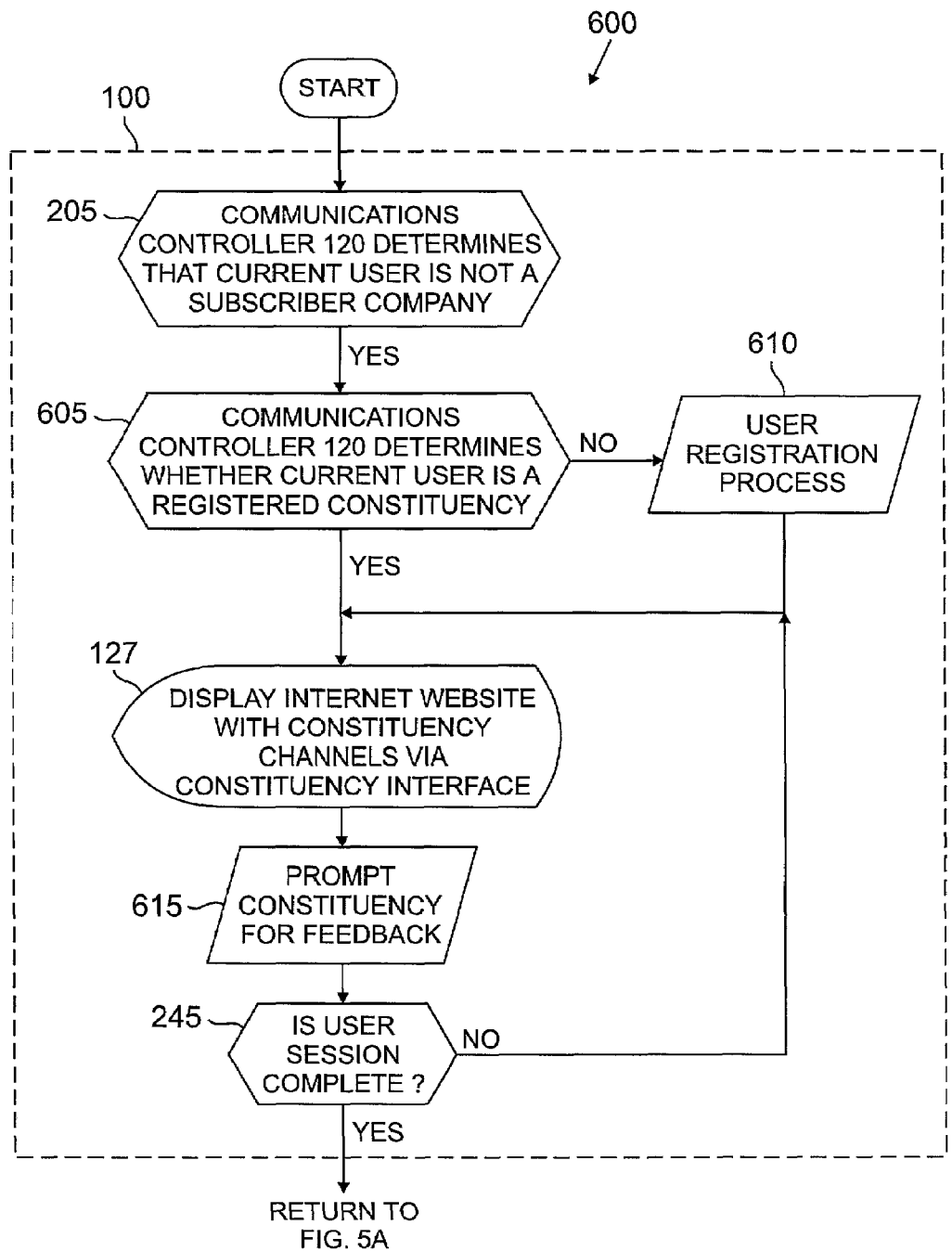
FIG. 6A illustrates a flow diagram of an exemplary method of operating the electronic commerce system of FIG. 4 for monitoring and analyzing one or more constituencies understanding and reaction to subscriber company information disclosures, whether new or updated, all in accordance with the principles of the present invention.

Referring next to FIG. 6A, illustrated is a flow diagram (generally designated 600) of an exemplary method of operating electronic commerce system 400, and, particularly, communications controller 420, of FIG. 4A for monitoring and analyzing one or more constituencies understanding and reaction to subscriber company information disclosures, whether new or updated, all in accordance with the principles of the present invention. Again, concurrent reference is made to FIGS. 4A to 5D for purposes of illustration.

To begin, communications controller 420 determines that a current user is not a subscriber company (e.g., constituency node 410a to 410n; "N" branch of decision step 505). Communications controller 420 then determines whether the current user is a registered user, e.g., a constituency member (decision step 605).

If the current user is not a registered user/constituency member ("N" branch of decision step 605), then communications controller 420 prompts the user through a constituency registration process (process step 610).

Communications controller 420 displays a selected view of a portion of database 101 as a function of identifying the user/constituency member and their associated constituency node 410 (process step 535). According to the illustrated embodiment, while communications controller processes constituency node 410 requests to review or otherwise process one or more selected views of the portion of database 101 (process step 540 of FIG. 5A), communications controller prompts the user/constituency member via constituency node 410 and interface 427 for feedback to analyze constituency understanding and reaction to commercial information communicated by company node 405 to constituency node 410 (process step 615). Thus, the user/constituency member interacts with communications controller 420 while viewing subscriber company generated information communications or commercial information through constituency interface 427, proving valuable feedback to the subscriber company.

For instance, if the subscriber were to publish a press release, communications controller 420, through constituency feedback, may suitably inform the subscriber company whether the press release was received as intended by one or more select constituencies. If the exemplary press release was in fact not properly received, then the subscriber company, via company node 405 and communications controller 420 may suitably modify one or more data files 429 associated with the subscriber company to provide additional comment to the press release to thereby ensure that the subject press release is received as intended by the one or more select constituencies. Further, the press release and related comment are fully disseminated to all constituencies via communications interfaces 427 thereby ensuring fair disclosure of commercial information in accord with the above-described requirements of the SEC (and like entities in other countries).

In prompting the user/constituency member for feedback, electronic commerce system 400 and, particularly, communications controller are operable to process the gathered feedback information and, in response thereto, modify particular ones of data files 429 for use by communications controller 420 and company node 405. According to one advantageous embodiment, communications controller 420 analyzes the gathered feedback information along with ones of data files 429 and, in response thereto, reports results thereof to company node 405. According to a related embodiment, communications controller 420, while gathering feedback information, employs mathematical representations to represent at least one of constituency understanding or constituency reaction in database 101 for use in such analysis.

Figure 6B:
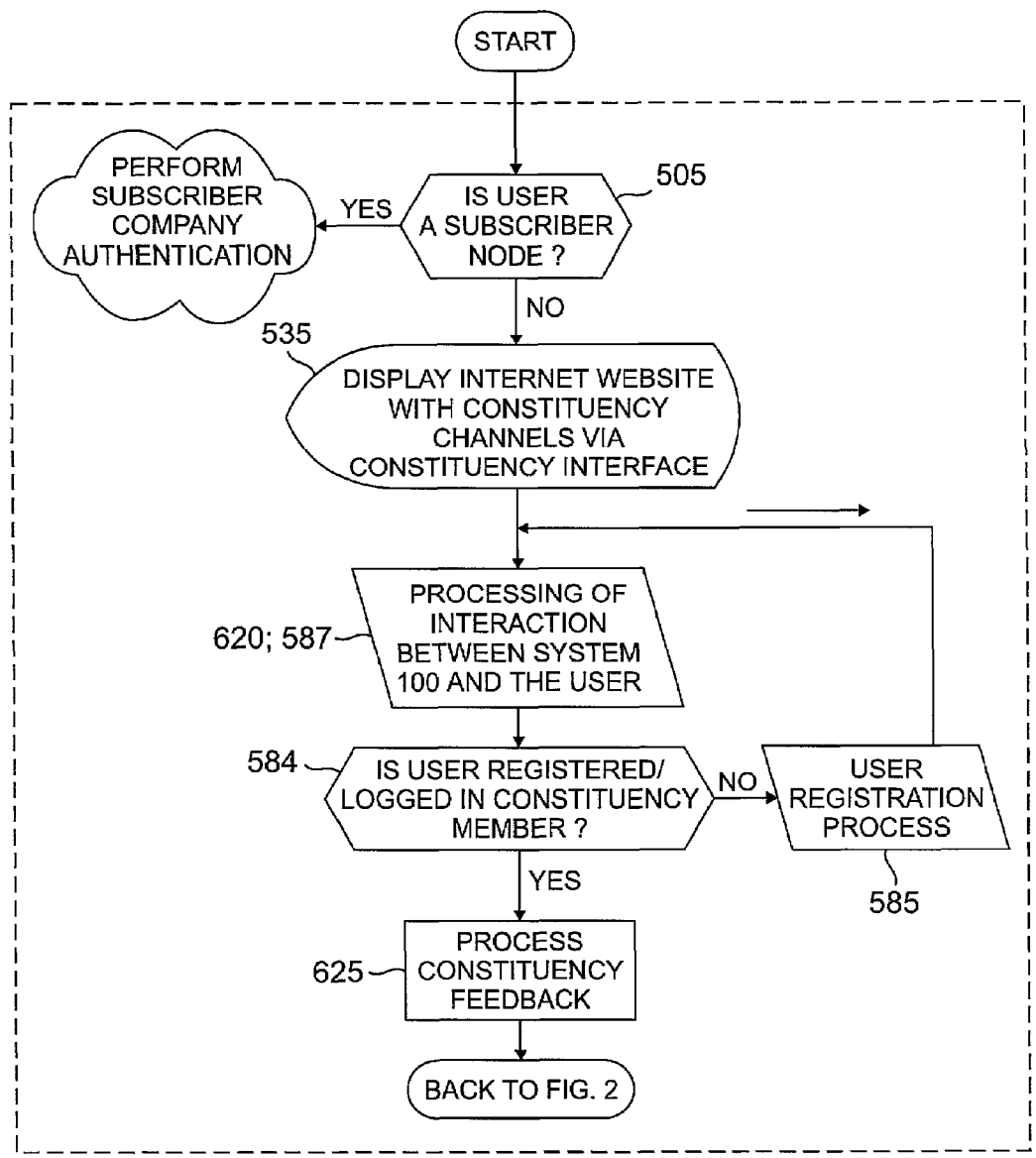
FIG. 6B illustrates a flow diagram of an exemplary advantageous method of operating the electronic commerce system of FIG. 1 for monitoring and analyzing one or more constituencies understanding and reaction to subscriber company information disclosures, whether new or updated, all in accordance with the principles of the present invention; and, FIG. 7 illustrates a general overview of an exemplary wireless network according to one embodiment of the present invention.

Referring next to FIG. 6B, illustrated is a flow diagram (generally designated 600') of an exemplary advantageous method of operating electronic commerce system 400, and, particularly, communications controller 420, of FIG. 4A for monitoring and analyzing one or more constituencies understanding and reaction to subscriber company information disclosures, whether new or updated, all in accordance with the principles of the present invention. Again, concurrent reference is made to FIGS. 4A to 5D for purposes of illustration.

According to this related embodiment, to begin, communications controller 420 of electronic commerce system 400 determines whether a current user is a subscriber company (e.g., company node 405) and, if so ("Y" branch of decision step 505), performs subscriber company authorization, for instance, possibly as set forth hereinabove with reference to FIG. 5A. However, if communications controller 420 determines that a current user is not a subscriber company (e.g., constituency node 410a to 410n; "N" branch of decision step 505), communications controller 420 displays a selected view of a portion of database 101—limited information (process step 535).

For purposes hereof, subsequent interaction between electronic commerce system 400 and the current user may be as described with reference to FIG.S 5A to 5D. Communications controller 420 prompts the current user for constituency feedback (interactive process step 587; sub-process step 620), and, if the current user is logged in/registered ("Y" branch of decision step 584), then communications controller in cooperation with database 101 process constituency feedback (process step 625). Communications controller thereby analyzes constituency understanding and reaction to commercial information communicated by company node 405 to constituency node 410. Thus, the user/constituency member interacts with communications controller 420 while viewing subscriber company generated information communications or commercial information through constituency interface 427, proving valuable feedback to the subscriber company.

In accord with the illustrated embodiment, database 101 under the control of communications controller 420 may be suitably arranged to monitor constituency node 410 response to and possibly initiate an alert notification to subscriber company via company node 405, all of which may or may not be based upon subscriber company defined parameters.

Figure 7:
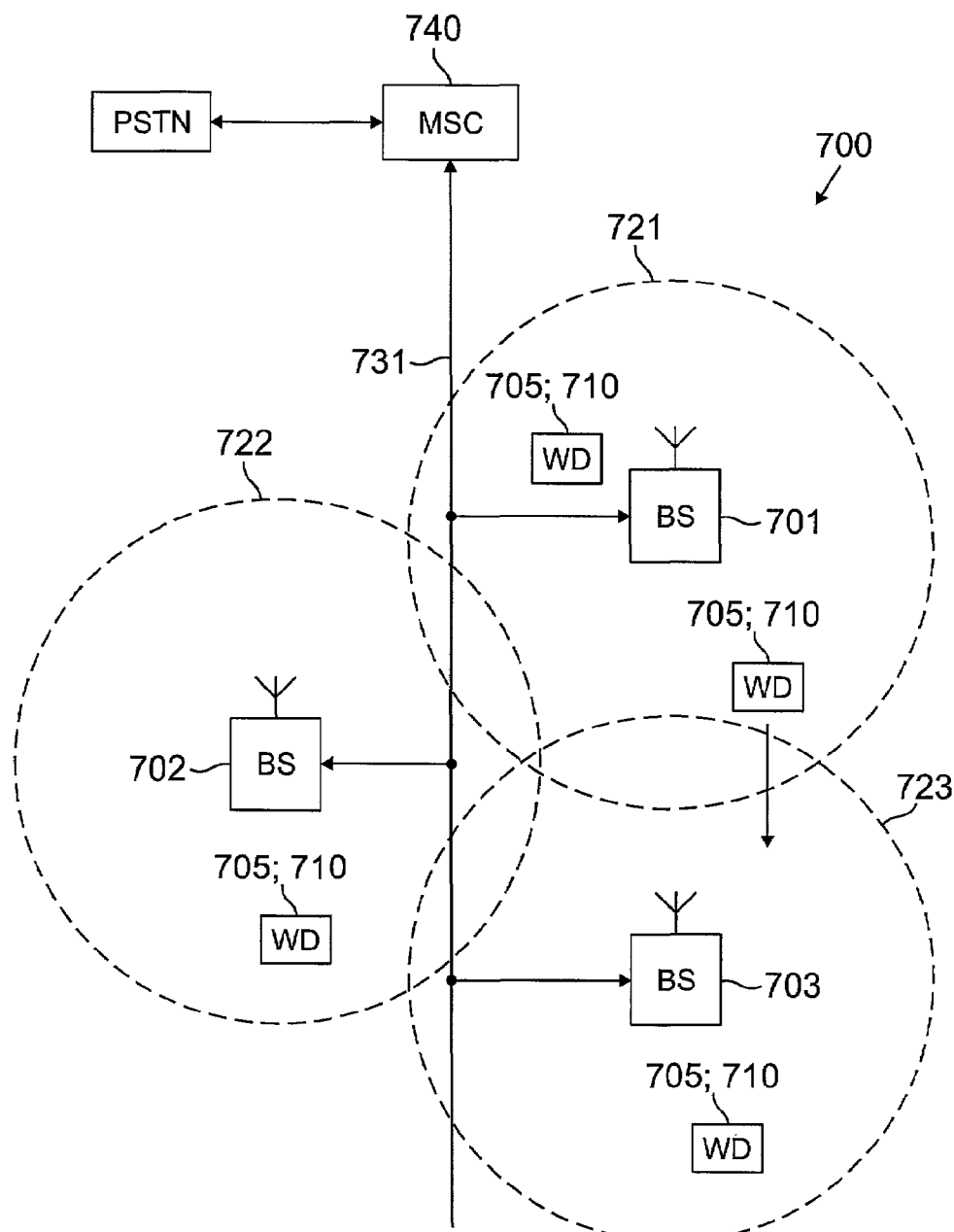

Referring lastly to FIG. 7, illustrated is a general overview of an exemplary wireless network 700 according to one embodiment of the present invention. Concurrent reference is made to FIGS. 4A to 6B for purposes of illustration.

Exemplary wireless network 700 comprises a plurality of cell sites 721 to 723, each containing one of the base stations ("BS") 701 to BS 703. Exemplary base stations 701 to 703 are operable to communicate with a plurality of wireless devices ("WD") 705; 710. Exemplary WDs 705; 710 may suitably function as any of company or constituency nodes 105; 110 and may be any suitable wireless communication devices, including conventional cellular telephones, PCS handsets, portable computers and data assistants, telemetry devices, and the like, that are capable of communicating with the base stations via wireless links.

Illustrative dotted lines are introduced to illustrate approximate boundaries of cell sites 721 to 723 in which base stations 701 to 703 are located. Exemplary cell sites 721 to 723 are shown approximately circular for the purposes of illustration and explanation only. It should be clearly understood that cell sites 721 to 723 also may have irregular shapes, depending on the cell configuration selected and natural and man-made obstructions.

BS 701 to 703 may be operable to transfer voice and data signals between each other and the public telephone system (not shown) via communications line 731 and mobile switching center ("MSC") 740. MSC 740 is well known to those skilled in the art.

Mobile switching center 740 is a switching device that provides services and coordination between the subscribers in a wireless network (e.g., company nodes 105 and constituency nodes 110) and external networks. Communications line 731 may be any suitable connection means, including a T1 line, a T3 line, a fiber optic link, a network backbone connection, a wireless link and the like. In some embodiments of the present invention, communications line 731 may be several different data links, where each data link couples one of BS 701 to 702, 703 to MSC 740. In addition, as is well known, a "handoff" is a transfer control of a call from a first cell to a second cell.

According to this embodiment, one or more of WDs 705; 710 in wireless network 700 may suitably be capable of executing real time applications, such as any of the functions of company nodes 705 and constituency nodes 710 of the above-disclosed embodiments. Thus, any of WDs 705; 710 may suitably be associated with electronic commerce system 400 and be capable of interacting with communications controller 420 and database 101. Again, according to this embodiment, communications controller 420 and data repository 425 are broadly operative to provide: (i) indexing and cross-referencing of company information by each subject of significance within database 101 to one or more constituencies; (ii) an automated interface for placing or updating information disclosures on the communications conduit via global communications network 415 to constituency nodes 410a to 410n; and (iii) monitoring and analyzing one or more constituencies' understanding and reaction to such new or updated information disclosures using communications controller 420.

Accordingly, wireless network 700 operates to receive real time data from, for example, Internet 415 and to transmit the same in a forward channel to ones of WDs 705;710 in accordance with electronic commerce system 400. According to this embodiment, the wireless nodes 705;710 operate to provide session scheduling for intelligent communication. Typical embodiments provide communications management functionality requiring a minimum of user control. Communication of commercial information between nodes 705;710 is enabled automatically in a manner which avoids unnecessary, annoying or ineffective interruptions. For instance, a constituency member may have multiple constituency nodes 410, such as a PCS phone and a PCS PDA. The constituency member may specify the type, amount, etc. of commercial information it wishes to receive depending on which device is being used; depending upon the device being used, communications controller 420 using database 101 can cooperatively alert the constituency member in a preferred manner dependent upon the wireless node used.

Further, with respect to data communicated by the user of wireless node 705;710, an illustrative example would be useful. For instance, if one of WDs 705;710 is a 3G cellular phone device that is capable of surfing the Internet and is controlled by a company node 405 user, IVR services may suitably be used to enable the wireless user to securely access associated data files 429 and to update the same using continuous speech. Alternatively, a constituency member controlling the same device may suitably access constituency channels and interact with electronic commerce system 400 to provide feedback or IVR based-service selection.

In sum, the principles of the present invention are directed broadly to systems for managing a database of selectable records, and methods of operating the same. Exemplary database administrator 102 of FIG. 1 (not shown) is associated with data repository 425 as well as a plurality of memory units. Database administrator 102 comprises database 101, an access controller and a security controller. The security controller operates repeatedly to (i) divide database 101 into portions and (ii) store ones of portions to ones of distributed memory units. The security controller systematically redistributes database 101 over distributed memory units. The access controller operates to repeatedly establish views of ones of selectable records of database 101 in response to the security controller redistributing portions of database 101 over distributed memory units.

From the discussion of the foregoing illustrative embodiments, the principles of the database management system of the present invention are suitably associable with an electronic commerce system 400 for monitoring communication of information by company node 405 to constituency nodes 410 and analyzing constituency understanding and reaction to such information communication, as well as methods of operating the same. Electronic commerce system 400, which is for use over a global communications network includes both company nodes 405 and constituency nodes 410, comprises communications controller 420, data repository 425 and database 101. Data repository 425 is operable to store data files, to database 101, associated with company nodes 405, wherein company nodes 405 populate respective associated data files 429 with commercial information. The database management system associated with database 101 to secure the same by systematically dividing database 101 (which again may be one or more databases) into portions and, then, storing ones of the portions to ones of distributed memory units. The database administrator thereby systematically redistributes the database over the distributed memory units, providing security in accordance with the principles hereof. In necessary cooperation therewith, the database management system operates to repeatedly establish (and re-establish) views of ones of the selectable records of database 101 in response to the security controller redistributing portions thereof over the distributed memory units.

In illustrative cooperation therewith, communications controller 420 is operable to (i) propagate communication interfaces 427 accessible by constituency nodes 410 with selected portions of the commercial information under direction of company nodes 405, and (ii) gather feedback information representative of constituency response to the constituency nodes 410 accessing the communication interfaces 427. Company node 405, through communications controller 420 and associated data repository 425, may suitably provide an interactive system that enables the company to generate and near-continuously communicate information to its constituency via global communications network 415, for instance the Internet.

Although the present invention has been described in detail, those skilled in the art should understand that they can make various changes, substitutions and alterations herein without departing from the spirit and scope of the invention in its broadest form.

What is claimed is:

1. For use in managing a database of selectable records, a database administrator for association with a computer system having distributed memory units, said database administrator comprising:
   a security controller that operates repeatedly on a periodic basis to (i) divide said database into portions and (ii) store ones of said portions to ones of said distributed memory units, said security controller thereby systematically periodically redistributing said database over said distributed memory units; and
   an access controller that operates to repeatedly establish views of ones of said selectable records responsive to said security controller periodically redistributing said database over said distributed memory units.

2. The database administrator set forth in claim 1 wherein said access controller is further operable to access ones of said selectable records.

3. The database administrator set forth in claim 1 initially operable to instantiate said database of selectable records.

4. The database administrator set forth in claim 3 wherein said initially instantiated database of selectable records is stored in a select memory unit.

5. The database administrator set forth in claim 1 wherein said security controller is further operable, prior to subsequently dividing said database into portions, to combine said ones of said portions previously stored in ones of said distributed memory units in a select memory unit.

6. For use in managing a database of selectable records, a method of operating a database administrator, said database administrator for association with a computer system having distributed memory units, said method of operation comprising the steps of:
   repeatedly operating a security controller on a periodic basis to (i) divide said database into portions and (ii) store ones of said portions to ones of said distributed memory units, said security controller thereby systematically periodically redistributing said database over said distributed memory units; and
   operating an access controller to repeatedly establish views of ones of said selectable records responsive to said security controller periodically redistributing said database over said distributed memory units.

7. The method of operating the database administrator set forth in claim 6 further comprising the step of accessing ones of said selectable records.

8. The method of operating the database administrator set forth in claim 6 further comprising the step of initially instantiating said database of selectable records.

9. The method of operating the database administrator set forth in claim 8 further comprising the step of storing said initially instantiated database of selectable records in a select memory unit.

10. The method of operating the database administrator set forth in claim 6 further comprising the step of further operating said security controller, prior to subsequently dividing said database into portions, to combine said ones of said portions previously stored in ones of said distributed memory units in a select memory unit.

11. A computer system comprising:
   a database of selectable records;
   a plurality of networked computers associated with distributed memory units, ones of said plurality of networked computers associated with said database of selectable records; and
   a database administrator for use in managing said database of selectable records, said database administrator operable to repeatedly on a periodic basis (i) divide said database into portions, (ii) store ones of said portions to ones of said distributed memory units to thereby systematically periodically redistribute said database over said distributed memory units and (iii) establish views of ones of said selectable records in response to periodically redistributing said database over said distributed memory units.

12. The computer system set forth in claim 11 wherein said database administrator is further operable to access ones of said selectable records.

13. The computer system set forth in claim 11 wherein said initially instantiated database of selectable records is stored in a select memory unit.

14. The computer system set forth in claim 11 wherein said database administrator is further operable, prior to subsequently dividing said database into portions, to combine said ones of said portions previously stored in ones of said distributed memory units in a select memory unit.

15. A method of operating a computer system to manage a database of selectable records, said computer system comprising a plurality of networked computers associated with distributed memory units, ones of said plurality of networked computers operable to share access with said database of selectable records, said method comprising the steps of
   initially instantiating said database of selectable records;
   repeatedly on a periodic basis dividing said database into portions and storing ones of said portions to ones of said distributed memory units, thereby systematically periodically redistributing said database over said distributed memory units; and
   repeatedly establishing views of ones of said selectable records in response to periodically redistributing said database over said distributed memory units.

16. The method of operating the computer system to manage a database of selectable records set forth in claim 15 further comprising the step of accessing ones of said selectable records.

17. The method of operating computer system to manage a database of selectable records set forth in claim 15 further comprising the step of storing said initially instantiated database of selectable records in a select memory unit.

18. The method of operating computer system to manage a database of selectable records set forth in claim 15 further comprising the step of further combining, prior to subsequently dividing said database into portions, said ones of said portions previously stored in ones of said distributed memory units in a select memory unit.

19. For use over a global communications network having company nodes and constituency nodes associated therewith, an electronic commerce system comprising:
   a database of selectable data files associated with said company nodes, wherein said company nodes populate respective associated data files with commercial information;
   a communications controller that is operable to (i) propagate communication interfaces accessible by said constituency nodes with selected portions of said commercial information under direction of said company nodes, and (ii) gather feedback information representative of constituency response to said constituency nodes accessing said communication interfaces; and
   a database administrator for association with distributed memory units, said database administrator comprising:
      a security controller that operates repeatedly on a periodic basis to (i) divide said database into portions and (ii) store ones of said portions to ones of said distributed memory units, said security controller thereby systematically periodically redistributing said database over said distributed memory units; and an access controller that operates to repeatedly establish views of ones of said selectable records responsive to said security controller periodically redistributing said database over said distributed memory units.

20. The electronic commerce system for use over a global communications network recited in claim 19 wherein said communications controller is further operable to process said gathered feedback information and, in response thereto, modify ones of said data files.

21. The electronic commerce system for use over a global communications network recited in claim 19 wherein said communications controller is further operable to analyze said gathered feedback information and ones of said data files and, in response thereto, to report results thereof to said company node.

22. The electronic commerce system for use over a global communications network recited in claim 19 wherein said communications controller, while gathering said feedback information, employs mathematical representations to represent at least one of constituency understanding and constituency reaction.

23. The electronic commerce system for use over a global communications network recited in claim 19 further comprising a security controller that is operable, with respect to those data files associated with said company node, to limit access to said data files to designated personnel of said company nodes.

24. The electronic commerce system for use over a global communications network recited in claim 23 wherein said security controller includes an interactive voice recognition controller that is operable to verify the identity of said designated personnel.

25. The electronic commerce system for use over a global communications network recited in claim 19 wherein said communications controller is further operable to translate said selected portions of said commercial information from a first language into a second language.

26. The electronic commerce system for use over a global communications network recited in claim 19 wherein said communications controller is further operable to store, index and relate associated portions of said commercial information in the data repository.

27. The electronic commerce system for use over a global communications network recited in claim 19 wherein said access controller is further operable to access ones of said selectable data files.

28. The electronic commerce system for use over a global communications network recited in claim 19 wherein said database administrator is initially operable to instantiate said database of selectable data files.

29. The electronic commerce system for use over a global communications network recited in claim 28 wherein said initially instantiated database of selectable data files is stored in a select memory unit.

30. The electronic commerce system for use over a global communications network recited in claim 19 wherein said security controller is further operable, prior to subsequently dividing said database into portions, to combine said ones of said portions previously stored in ones of said distributed memory units in a select memory unit.

31. The electronic commerce system for use over a global communications network recited in claim 19 wherein said communications controller is further operable to organize said selected portions of said commercial information that propagate said communication interfaces into channels accessible by said constituency nodes.

32. The electronic commerce system for use over a global communications network recited in claim 31 wherein said channels include at least two of an overview channel, an outlook channel, a community consensus channel, a community forecast channel, a research channel, an online q&a channel, an online conference channel, a financial history channel and a newsroom channel.

* * * * *